US008873896B1

(12) United States Patent
Kissa

(10) Patent No.: US 8,873,896 B1
(45) Date of Patent: Oct. 28, 2014

(54) DUAL POLARIZATION OPTICAL MODULATOR USING DUAL BROADBAND MULTI-ELECTRODE WEIGHTED DIRECT ANALOG PHASE MODULATORS

(71) Applicant: JDS Uniphase Corporation, Milpitas, CA (US)

(72) Inventor: Karl Kissa, West Simsbury, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 13/901,433

(22) Filed: May 23, 2013

(51) Int. Cl.
*G02F 1/035* (2006.01)
*G02F 1/03* (2006.01)

(52) U.S. Cl.
CPC ............ *G02F 1/0316* (2013.01); *G02F 1/0322* (2013.01); *G02F 1/0327* (2013.01)
USPC ...................................... 385/3; 385/2; 385/40

(58) Field of Classification Search
CPC .... G02F 1/0322; G02F 1/0327; G02F 1/0316
USPC .................................................. 385/1–3, 40
See application file for complete search history.

(56) References Cited

U.S. PATENT DOCUMENTS

| 6,501,867 | B2 | 12/2002 | Gates, II et al. ................... 385/2 |
| 6,580,840 | B1 | 6/2003 | McBrien et al. ................... 385/2 |
| 7,058,241 | B2 | 6/2006 | Sugiyama et al. ................ 385/4 |
| 7,088,875 | B2 | 8/2006 | Sugiyama et al. ................ 385/3 |
| 7,277,603 | B1 | 10/2007 | Roberts et al. .................... 385/1 |
| 7,701,630 | B2 | 4/2010 | Kissa et al. ................... 359/254 |
| 8,044,835 | B2 | 10/2011 | Ehrlichman et al. .......... 341/137 |
| 8,050,555 | B2 | 11/2011 | McBrien ......................... 398/16 |
| 2004/0141222 | A1 | 7/2004 | Miyazaki et al. ............. 359/237 |
| 2011/0158576 | A1 | 6/2011 | Kissa et al. ....................... 385/3 |

OTHER PUBLICATIONS

T. Sakamoto, "Coherent synsthesis of optical multilevel signals by electrooptic digital-to-analog conversion using multiparallel modulator," IEEE Journal of Selected Topics in Quantum Electronics, vol. 16, No. 5, Sep./Oct. 2010, pp. 1140-1149.
Y. Ehrlichman, et. al., "Photonic digital-to-analog conversion and digitally driven integrated optics modulator," 2011 IEEE International Conference on Microwaves, Communications, Antennas and Electronics Systems (COMCAS), Issue Date: Nov. 7-9, 2011, pp. 1-4.
X. Zhou, et. al., "8x114 Gb/s, 25-GHz-spaced, PolMux-RZ-8PSK transmission over 640 km of SSMF employing digital coherent detection and EDFA-only amplification," Proceedings from postdeadline papers, 2008 Optical Fiber Communication conference, PDP1.
T. Sakamoto, et. al., "Electro-optic synthesis of multi-level coherent signals," OptoElectronics and Communications Conference, 2009. OECC 2009, 14$^{th}$, Jul. 13-17, 2009, pp. 1-2 available online at: http://ieeexplore.icee.org/xpl/articleDetads.jsp?arnumber=5213285&refinements%3D4281366797%26sortType%3Dase_p_Sequence%26filter%3DAND%28p_IS_Number%3A5212811%29.
OIF "100G Ultra Long Haul DWDM Framework Document" Optical Internetworking Forum (Jun. 2009) available online at: www.oiforum.com/public/documents/OIF-FD-100g-DWDM-01.0.pdf.

*Primary Examiner* — Rhonda Peace
(74) *Attorney, Agent, or Firm* — JDS Uniphase Corporation

(57) ABSTRACT

An electro-optical phase modulator, dual polarization modulator applying that modulator and a phase modulation method are disclosed. A waveguide in an electro-optical substrate has at least two electrodes for modulating the waveguide. Each electrode receives a sequential bit of a precoded digital input and forms a shifting line from a first input end through interaction lengths near the waveguide causing modulation, shifted lengths distal from the waveguide for avoiding modulating the waveguide and transitions between these lengths by shifting the electrode away from or towards the waveguide. At least one electrode has a shorter interaction length closer to the input than a longer interaction length of the same electrode. Each electrode's modulation strength is proportional to its total interaction length, which doubles for each electrode, producing well matched S21 electro-optical responses from 10 kHz to 50 GHz, when shifted to account for the doubling.

27 Claims, 20 Drawing Sheets

$$\alpha(f) = (\alpha_{00} f + \alpha_{01} \sqrt{f}) \quad (1)$$

$$V(f, L) = V_0 e^{-\alpha(f)L} \quad (2)$$

Figure 14

$$F_{i,j}(f, L_{s,i}, L_{f,i}) = \frac{EO_{i,j}}{V_0 L_{tot}} \int_{L_{s,i}}^{L_{f,i}} V_0 e^{-\alpha(f)z} dz = EO_{i,j} \frac{\left(e^{-\alpha(f)L_{s,i}} - e^{-\alpha(f)L_{f,i}}\right)}{\alpha(f) L_{tot}} \quad (3)$$

$$F_{total,j}(f) = \sum_{i=1}^{N} EO_{i,j} \frac{\left(e^{-\alpha(f)L_{s,i}} - e^{-\alpha(f)L_{f,i}}\right)}{\alpha(f) L_{tot}} \quad (4)$$

$$V(0, L) = V_0 \quad (5)$$

$$F_{total,j,DC} = \sum_{i=1}^{N} EO_{i,j} \frac{L_i}{L_{tot}} \quad (6)$$

Figure 15

$$F_{total,j,DC} = c_j \, F_{total,j-1,DC} \qquad j = 2, \ldots N_{elec} \quad (7)$$

$$F_{total,j}(f_k) = c_j \, F_{total,j-1}(f_k) \qquad j = 2, \ldots N_{elec} \quad (8)$$

$$(N_{freq} + 1)(N_{elec} - 1) \leq N - 1 \quad (9)$$

$$L_{tot} = \sum_{i=1}^{N} L_i \quad (10)$$

Figure 16

DUAL POLARIZATION OPTICAL MODULATOR USING DUAL BROADBAND MULTI-ELECTRODE WEIGHTED DIRECT ANALOG PHASE MODULATORS

TECHNICAL FIELD

The present invention relates to broadband electro-optical phase modulators and in particular, to well matched high frequency electro-optical phase modulators having multiple multi-sectioned electrodes for modulating a single waveguide without domain inversion.

BACKGROUND OF THE INVENTION

Electro-optical modulators modulate electrical signals onto a light beam in order to generate a modulated optical beam that carries data. Optical waveguide modulators are well known in the art and are used in a variety of applications.

An electro-optical phase modulator according to the present disclosure may be useful in the prior art 100 G CFP modulator illustrated in FIG. 1. The 100 Gb/s small form factor device 100 consists of an input fiber 10 for receiving an optical signal 11 connected to a lithium niobate substrate 12 having a waveguide 14 with a y-branch 16 to split the optical signal onto two arms, each of which is modulated by phase modulators 18 having an I input electrode 20 and a Q input electrode 22. The two waveguide arms are then combined with a micro-optic polarization multiplexer 24 and output through output fiber 26. Each phase modulator 18 modulates a four amplitude level RF signal that is then polarization multiplexed to result in a dual polarization Quadrature Phase Shift Keying (QPSK) optical signal 28.

The length of the electrodes 20, 22 are adjusted such that the strength of the electro-optic (e/o) response from the Q inputs is ½ that of the e/o response from the I inputs. In FIG. 1, the I RF signal produces a 0° or 180° optical phase shift while the Q RF signal produces a 45° or −45° optical phase shift in addition to that produced by the I RF signal. For the case where RF loss can be neglected in the RF electrodes, the scaling can be accomplished by scaling the electrode lengths by a 2:1 ratio. Hence, the I electrodes 20 use ⅔ of the available total electrode length while the Q electrodes 22 use ⅓ of available length. Each phase modulator 18 is driven by a two-level 25 Gb/sec binary data signal (not illustrated) that is precoded to preserve the digital sequence of the data at the receiver. For example, digital exclusive OR prescaling may be applied to the Q RF input signal but not the I RF input signal, in order to preserve the digital sequence of I and Q at the receiver.

Precoding the RF input signal or signals combined with electro-optic scaling and summation is a much simpler and more compact method to create a 4-level optical signal from two conventional 2-level 25 Gb/sec binary data signals than performing Digital Signal Processing (which consumes significant electrical power) or RF signal summation. In RF signal summation, the two RF electrical signals are summed by brute force where the amplitude of one signal is reduced by 2× relative to the other. RF signal summation requires RF hardware that occupies some space on transmitter card and requires careful control of any timing skew from the two combined binary signals.

FIG. 2 illustrates the optical phase constellation diagram for the QPSK signal produced by each phase modulator 18, where the x and y axis represent real and imaginary components of the optical signal. The 4 RF amplitude levels result in the 4 optical phase states shown in FIG. 2.

FIG. 3 illustrates an example prior art phase modulator 18 comprising two staggered electrodes reversed in order from FIG. 1. For sake of simplicity, ground lines are not shown in any of the Figures; however, there are typically one or two ground lines for each signal electrode creating a ground-signal or ground-signal-ground electrode geometry, respectively. In addition, it is assumed that a signal electrode does not modulate any waveguides once it shifts or jogs off to the side distal from the waveguide.

The electrode design illustrated in FIG. 3 is useful for the case where the RF inputs are co-located near the optical input end of the chip. The two electrodes 20, 22 run parallel to one another from the input end to the output end of the waveguide. The optical signal is first modulated by signal electrode 22. The two electrodes jog over laterally relative to the optical path to allow the other electrode 20 to modulate the waveguide. An electro-optic (e/o) interaction length is defined to be the portion of the electrode where the electrode is in close proximity to the waveguide, such that field lines emanating from the RF signal electrode overlap the optical field in the waveguide. The region of the substrate in which an interaction length modulates the waveguide is also referred to as an interaction region. The lengths, $L_1$ and $L_2$, correspond to the lengths of the e/o interaction region for the two electrodes. Normalized by the total length of interaction regions for both electrodes, $L_1$=0.333 and $L_2$=0.667. The ratio of those lengths, $L_2/L_1$=R, is equal to 2. The I data signal is applied to RF electrode 20, while a precoded Q data signal is applied to electrode 22. The order of the electrodes I and Q is reversed from that shown in FIG. 1 in an attempt to reduce RF Loss experienced in electrode 22.

FIG. 4 illustrates the calculated S21 (e/o) frequency response for the I and Q inputs of a phase modulator 18 according to FIG. 3 for the case where the expected RF loss for the electrodes is introduced. The total e/o interaction length is 43 mm. Loss coefficient for RF loss will be defined later; however, both electrodes 20, 22 have approximately 6 dB of electrical loss along their length. Note that the interaction length for electrode 20 is twice that of electrode 22. In addition, electrode 20 has length $L_1$ before electro-optic interaction begins for that electrode. The net effect is that the RF loss in electrode 20 during or before electro-optic interaction is higher than for electrode 22, hence bandwidth for electrode 20, the I signal, is lower than for electrode 22, the Q signal. The thick line in FIG. 4 is the S21 (e/o) response for the I RF signals, where as the thin line is the S21 (e/o) response for the Q RF signals shifted up by 6 dB to account for the 2:1 scaling ratio. Ideally after this shifting, the two curves would lie directly on top of one another providing perfectly matched S21 e/o frequency responses. As can readily be seen in FIG. 4, the S21 (e/o) frequency responses are markedly different, by as much as about 2 dB at 20 GHz, and more at higher frequencies. The 3 dB bandwidth for the I input is about 30 GHz, however the 3 dB bandwidth for the Q input exceeds 50 GHz.

The mismatch in frequency response will degrade the quality of the constellation diagram in FIG. 2 because the I and Q e/o responses will not match for different digital data bit sequences having different electrical spectral content. The dots for the 4 different phase states will become smeared out along the circles illustrated in FIG. 2. For digital sequences dominated by low frequency content, the scaling will be close to 2:1. For digital sequences dominated by high frequency content, the scaling will be less than 2:1. At high frequencies, the optical phase shift produced by the I signal will be significantly less than 180° while the optical phase shift produced by the Q signal will be closer to its nominal value of 45° or −45°.

The phase modulator design can be improved by adjusting the electrode lengths to cause matching of scaled responses at some specific frequency greater than zero, however, the pattern dependent scaling and frequency mismatching of I and Q will still persist. Furthermore, if velocity mismatch (Nrf_error) is considered, the performance of the phase modulators 18 illustrated in FIGS. 1 and 3 decreases further because the separation between the S21 frequency responses increases. An Nrf_error value of 0.03 is within the distribution of typical values for a high volume modulator manufacture line.

For high frequency applications, which are becoming more prevalent, the phase modulators 18 illustrated in FIGS. 1 and 3 do not produce well matched s21 (e/o) frequency responses. It would be advantageous to provide an electro-optical phase modulator having well matched S21 (e/o) frequency responses over a broad range of frequencies.

Some prior art Mach-Zehnder modulators, such as taught in U.S. Patent Publication No. 2011/0158576 published Jun. 30, 2011 to Kissa, U.S. Pat. No. 7,701,630 issued Apr. 20, 2010 to Kissa et al., U.S. Pat. No. 6,501,867 issued Dec. 31, 2002 to Gates, II et al., and U.S. Pat. No. 7,058,241 issued Jun. 6, 2006 to Sugiyama et al., which are each incorporated herein by reference, teach various modulator structures applying domain inversion regions in the waveguide substrate to modulate two waveguides with a single signal electrode with balanced push and pull modulation. They do not teach how to modulator light within a waveguide using more than one signal electrode, nor do they teach how to match the frequency responses corresponding to different signal electrodes.

U.S. Pat. No. 7,277,603 issued Oct. 2, 2007 to Roberts et al. and incorporated herein by reference, teaches digital-to-analog conversion using modulators integrated with electronic drivers.

U.S. Pat. No. 8,044,835 issued October 25, 211 to Ehrlichman and incorporated by reference herein describes a MZ modulator having phase modulators having electrode lengths based on powers of two. Further optimization of electrode lengths could remove small non-linearities in output; but for more significantly non-linear devices, optimizing binary control vectors for a digital-to-analog converter without changing electrode lengths was considered more suitable.

Paragraph 52 of U.S. Pat. No. 8,050,555 issued Nov. 1, 2011 to McBrien and incorporated herein by reference, describes an M-ary Phase Shift Keying (MPSK) modulator using a series of independent phase modulators, each having different lengths according to a binary progression to perform the conversion from binary digital signals to the multi-level optical PSK signal.

In U.S. Pat. No. 6,580,840 issued Jun. 17, 2003 to McBrien et al. and incorporated herein by reference, a prior art electro-optic device increases modulation efficiency by compensating for velocity mismatch between the optical and electrical signals propagating through the device by using phase reversal sections that are co-linear with the optical waveguide; however, it was found that such devices have relatively low modulation efficiency per unit length.

Some other prior art references related to binary weighted phase shift keying modulators include [1] T. Sakamoto, "Coherent synthesis of optical multilevel signals by electrooptic digital-to-analog conversion using multiparallel modulator," IEEE Journal of Selected Topics in Quantum Electronics, Vol. 16, No. 5, September/October 2010, pp. 1140-1149; [2] Y. Ehrlichman, et. al., "Photonic digital-to-analog conversion and digitally driven integrated optics modulator," 2011 IEEE International Conference on Microwaves, Communications, Antennas and Electronics Systems (COMCAS), Issue Date: 7-9 Nov. 2011, pp. 1-4; and [3] X. Zhou, et. al., "8×114 Gb/s, 25-GHz-spaced, PolMux-RZ-8PSK transmission over 640 km of SSMF employing digital coherent detection and EDFA-only amplification," Proceedings from postdeadline papers, 2008 Optical Fiber Communication conference, PDP1, each of which is incorporated herein by reference. [1] teaches optical digital-to-analog conversion performed using parallel modulator topologies. [2] describe optical digital-to-analog conversion performed using serial modulator topologies. [3] describes 8PSK modulation format using cascaded Mach-Zehnder (MZ) interferometer modulators with two phase modulators.

SUMMARY OF THE INVENTION

The present disclosure may solve the problem of mismatched S21 (e/o) frequency responses in direct analog phase modulators operating at high frequencies by using two or more interaction regions having different lengths for at least one of the electrodes to compensate for the effects of RF loss. The different interaction regions may be cascaded one after another, producing well matched S21 (e/o) frequency responses.

One aspect of the present disclosure provides, an electro-optical phase modulator having a substrate of electro-optical material and a waveguide formed in the substrate comprising an input for receiving incoming light and an output for outputting data modulated light. A set of at least two electrodes are disposed on the substrate for modulating the waveguide. Ground lines are disposed on the substrate relative to the set of electrodes. Each electrode in the set forms a shifting line relative to the waveguide. Each electrode has a first end proximate to the input for receiving a sequential bit of a precoded digital data input signal, at least one interaction length proximate to the waveguide for causing modulation in the waveguide, at least one shifted length distal from the waveguide for avoiding causing modulation in any other waveguides, at least one transition length between an interaction length and a shifted length, for shifting the electrode away from or towards the waveguide, and a second end proximate to the output. At least one electrode of the set has a first interaction length proximate to the input that is shorter than a second interaction length of the same electrode. At any position along the waveguide, at most one interaction length is proximate to the waveguide and adjacent interaction lengths are driven by different electrodes. Each electrode has a modulation strength proportional to the sum of its interaction lengths, whereby a scaling ratio of the modulation strengths is equivalent to the geometric sequence $2^{n-1}$ for n=1 to the number of electrodes in the set. Whereby the modulation strengths of each electrode produce S21 electro-optical frequency responses that are approximately equal to each other, when shifted to account for the scaling ratio.

Another aspect of the present disclosure provides a dual polarization electro-optical modulator having an optical splitting arrangement (OSA) for splitting incoming light into a first and a second waveguide arm, both arms formed in a substrate of electro-optic material; and an optical combining arrangement (OCA) for polarization multiplexing the light from both arms into a dual polarization output signal. A first and a second set of at least two multi-section electrodes and ground lines are disposed on the substrate along the first and second arms, respectively. A first and a second precoded digital data input signal is associated with the first and second electrode sets, respectively. Each electrode of either set forms a shifting line relative to its respective waveguide. Each electrode having a first end proximate to the OSA for receiving a sequential bit of its respective precoded digital data input signal, at least one interaction length proximate to its respective arm for causing modulation in that arm, at least one shifted length distal from its respective arm for avoiding causing modulation in either arm, at least one transition length between an interaction length and a shifted length, or between two shifted lengths, for shifting the electrode away from or towards its respective arm, and a second end proximate to the OCA. At least one electrode of each set has a first interaction length proximate to that electrode's first end that is shorter than a second interaction length of the same electrode. At any position along both waveguide arms, at most one interaction length is proximate to each arm and interaction lengths adjacent on the same arm are driven by different electrodes. Each electrode has a modulation strength proportional to the sum of its interaction lengths, whereby a scaling ratio of the modulation strengths for each electrode set is equivalent to the geometric sequence $2^{n-1}$ for n=1 to the number of electrodes in each set. Whereby the modulation strengths of each electrode produce S21 electro-optical responses that are approximately equal to each other, when shifted to account for the scaling ratio.

A further aspect of the present disclosure provides a method for electrically phase modulating light in an electro-optical phase modulator comprising a waveguide formed in a substrate of electro-optical material, the waveguide having an input and an output, a set of at least two electrodes disposed on the substrate extending from the input to the output, ground lines disposed on the substrate relative to the set of electrodes and a precoded digital data input signal. The method comprises: (a) receiving light in the waveguide at the input; (b) driving each electrode in the set from an end proximate to the input with a sequential bit from the precoded digital data input signal; (c) modulating the light in the waveguide from a first interaction length of a first electrode proximate to the waveguide; (d) shifting the first electrode away from the waveguide after (b) such that the first electrode does not modulate the waveguide; (e) shifting a second electrode towards the waveguide after (b); (f) after (d) and (e), modulating the light in the waveguide from a first interaction length of the second electrode proximate to the waveguide; (g) shifting the second electrode away from the waveguide after (f), such that the second electrode does not modulate the waveguide; (h) shifting a first electrode towards the waveguide after (f); (i) after (g) and (h), modulating the light in the waveguide from a second interaction length of the first electrode, longer than the first interaction length of the first electrode, proximate to the waveguide; (j) outputting the data modulated light from the waveguide after (i); (k) providing the interaction lengths of the electrodes such that the total interaction length of each electrode is proportional to the geometric sequence 2n–1 for n=1 to the number of electrodes in the set; and (1) producing S21 electro-optical responses from each electrode that are approximately equal to each other, when shifted to account for the differences in total interaction lengths between electrodes.

Where alternative embodiments and additional aspects of those embodiments are described in the present disclosure, these embodiments and aspects may be combined in any manner within a single embodiment unless the present disclosure suggests otherwise. While preferred embodiments may be illustrated or described herein, they are not intended to limit the invention. Rather, numerous changes including alternatives, modifications and equivalents may be made as would be understood by the person skilled in the art.

BRIEF DESCRIPTION OF THE DRAWINGS

The invention will be described in greater detail with reference to the accompanying drawings:

FIGS. 14-16 illustrate various mathematical equations related to the systems of simultaneous equations according to the present disclosure;

DETAILED DESCRIPTION

Figure 5:
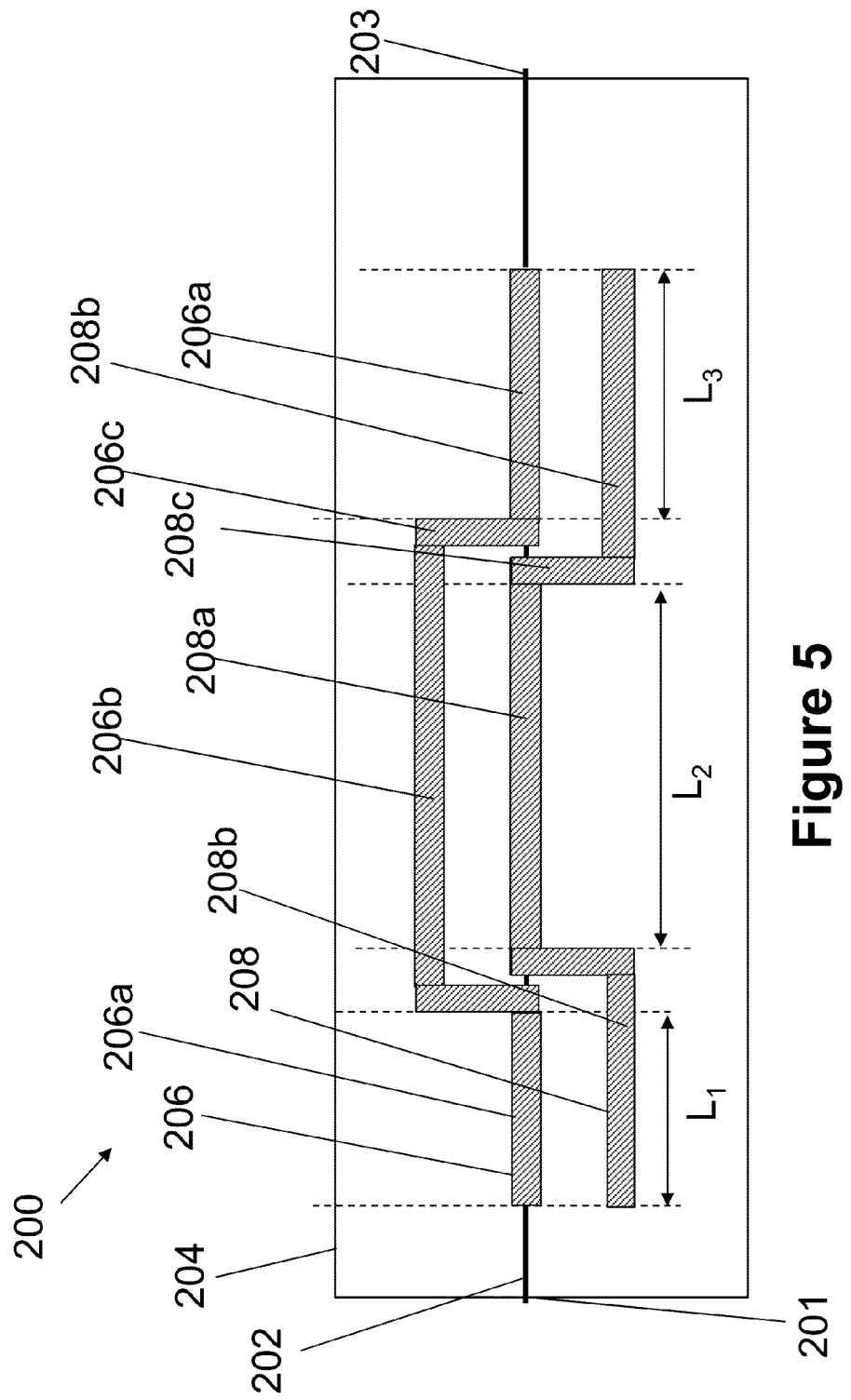
FIG. 5 is an electro-optical phase modulator having two electrodes forming interaction lengths according to the present disclosure.

FIG. 5 illustrates a first embodiment of the present disclosure comprising a three interaction section modulator from two staggered electrodes. RF signal electrode #1 206 has two interaction regions 206a that are before and after a single interaction region 208a for RF signal electrode #2 208. The sum of the first and third interaction regions, $L_1+L_3$, is twice that of the second interaction region of length $L_2$ in order to achieve the 2:1 scaling ratio of modulation strengths. The third interaction region length, $L_3$, is longer than the first, $L_1$, to compensate for RF loss in the electrode. The difference in lengths of the first and third sections causes the center of the second section to be before the center of the entire structure. The lengths of the three sections, $L_1$, $L_2$, and $L_3$, normalized to the total electrode length, are 0.309, 0.333, and 0.358, respectively. For this design, the I signal is applied to signal electrode #1 while the Q signal is applied to signal electrode #2.

In FIG. 5, the electro-optical phase modulator 200 comprises a waveguide 202 disposed in a substrate 204 having electro-optical effects and no domain inversion regions, such as Lithium Niobate ($LiNbO_3$). An I RF signal electrode 206 and a Q RF signal electrode 208 are disposed on the substrate 204 generally along the waveguide 202. The waveguide 202 comprises an input 201 for receiving incoming light and an output 203 for outputting data modulated light. Ground lines disposed on the substrate relative to the electrodes are not illustrated. Each electrode 206, 208 forms a shifting line relative to the waveguide from an end near the waveguide's input to an end near its output. The electrodes 206, 208 are multi-sectioned.

Using electrode 206 as an example, each electrode comprises interaction lengths 206a, shifted lengths 206b, 208b and transition lengths 206c, 208c. Interaction lengths 206a are lengths of an electrode that are proximate to the waveguide 202 for modulating the waveguide. Shifted lengths 206b are lengths that are distal from the waveguide to avoid causing any appreciable modulation in the waveguide (or in any other waveguides for that matter). The electrodes are shifted laterally enough between interaction regions such that the fields emanating from the shifted lengths of the signal electrodes have minimal or no overlap in the interaction region near the waveguide. Transition lengths 206c are lengths that shift the electrode towards or away from the waveguide. The total interaction length of the set of electrodes 206, 208 is the sum of the interaction lengths of all electrodes in the set. Some negligible modulation may occur in spaces between interaction lengths; however, this can generally be safely ignored.

At any position along the waveguide 202, at most one interaction length 206a, 208a is proximate to the waveguide 202. Adjacent interaction lengths, such as the lengths in interaction regions $L_1$ and $L_2$, are driven by different electrodes (206 and 208 respectively in FIG. 5). Each electrode provides a modulation strength proportional to the sum of its interaction lengths whereby a scaling ratio of the modulation strengths is equivalent to a powers of 2 geometric sequence (1:2:4:8:16, etc.) or more generally the geometric sequence $2^{n-1}$ for n=1 to the number of electrodes in the set.

The modulation strength of each electrode produces S21 electro-optical frequency responses that are approximately equal to each other, when shifted to account for the scaling ratio, over a frequency range of 10 kHz to 50 GHz. In some embodiments, the S21 responses are closely matched over a frequency range of 20 GHz to 50 GHz or some other frequency range containing most of the frequency spectrum of the digital signal.

Figure 6:
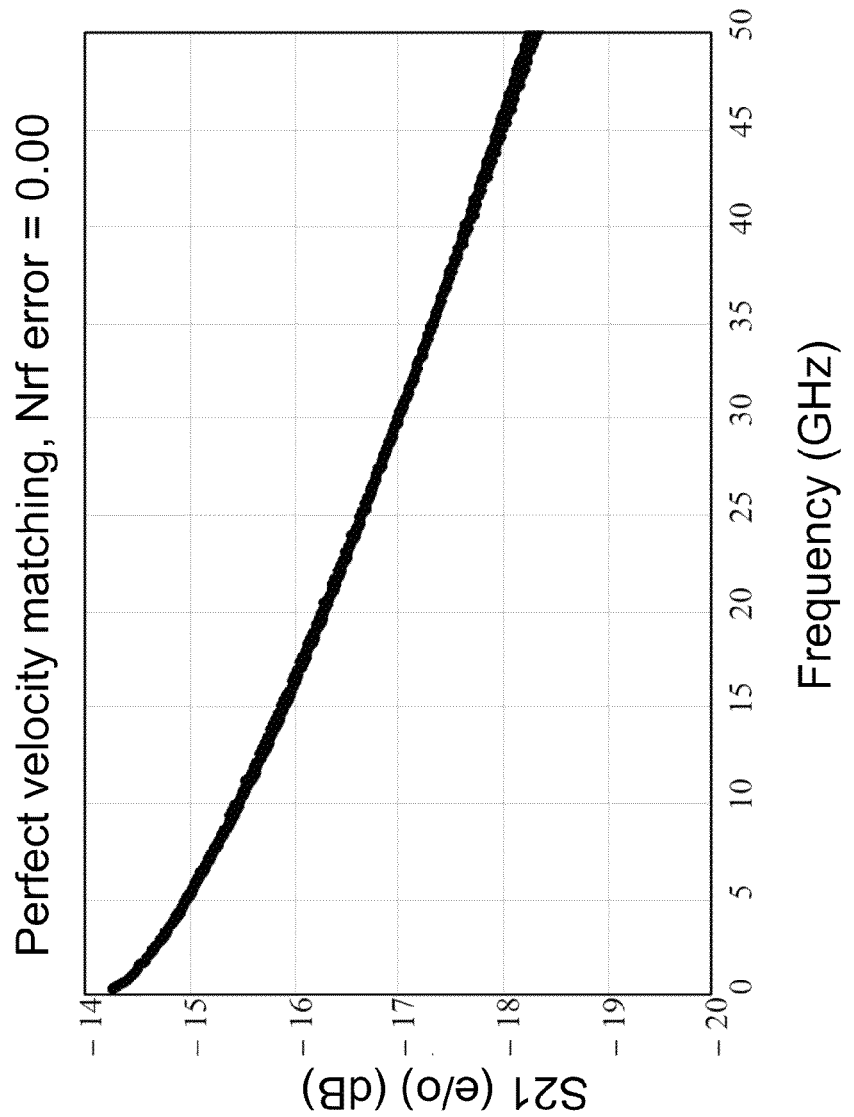
FIG. 6 is a graph of calculated S21 electro-optical frequency response for the I and Q inputs of the phase modulator according to FIG. 5 including expected RF electrode loss and presuming perfect velocity matching.
Figure 7:
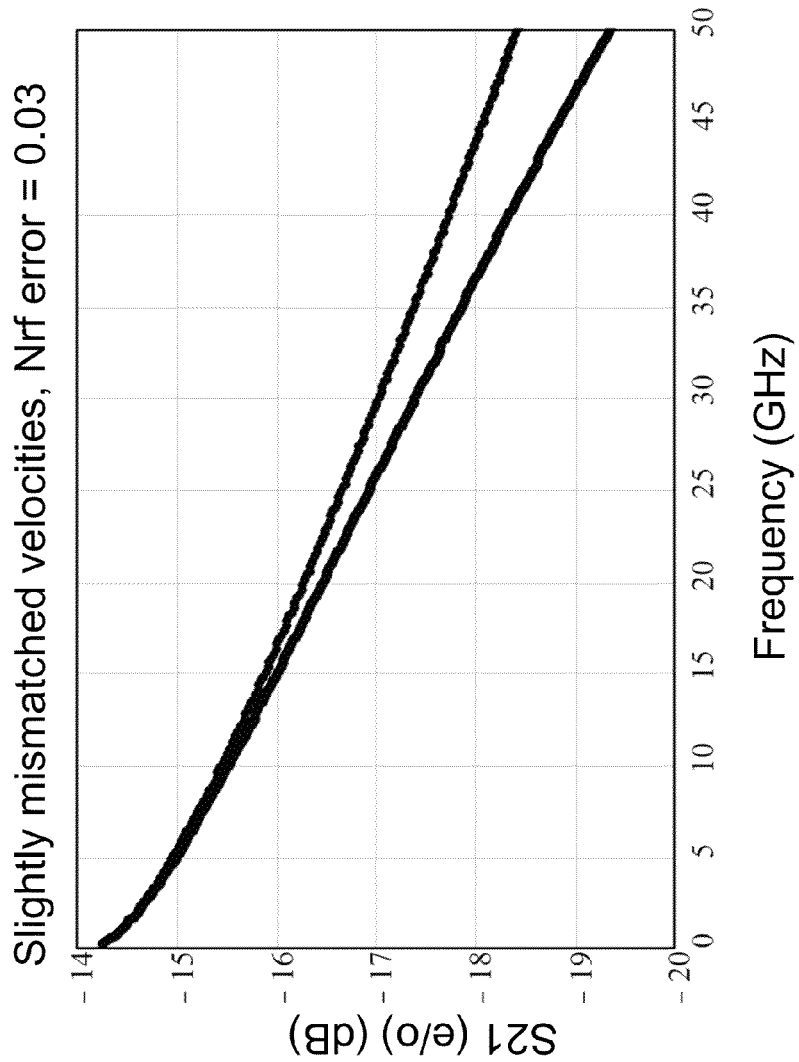
FIG. 7 is a graph of calculated S21 electro-optical frequency response for the I and Q inputs of the phase modulator according to FIG. 5 including expected RF electrode loss and velocity mismatching.

FIGS. 6 and 7 illustrate calculated S21 (e/o) frequency response for phase modulator 200 where the Q RF signal S21 (e/o) response has been shifted up by 6 dB to account for the 2:1 scaling ratio of modulation strengths. The thick line is the S21 (e/o) response for the I RF signals, while the thin line represents the Q RF signals. FIG. 6 illustrates the case of perfect velocity matching (where the RF and optical signals travel at the same velocity). The amount of velocity mismatch is defined by the difference between actual microwave index and optimum microwave index, Nrf_error, where the optimum case results in maximum bandwidth.

For the case of no velocity mismatch (Nrf_error=0.00) in FIG. 6, the two response curves lie almost completely on top of one another, showing the matching of frequency responses has been accomplished. In FIG. 7, an Nrf_error value of 0.03 results in approximately 0.6 dB difference in frequency response at 40 GHz. An Nrf_error value of 0.03 is within the distribution of typical values for a high volume modulator manufacture line. Even with velocity mismatch, the difference between the shifted S21 (e/o) response curves is much less than with the prior art designs where no velocity mismatch was included.

In some embodiments, the s21 electro-optical responses differ from one another by less than about 3 dB, when shifted to account for the scaling ratio, over a frequency range of 20 GHz to 50 GHz.

Figure 8:
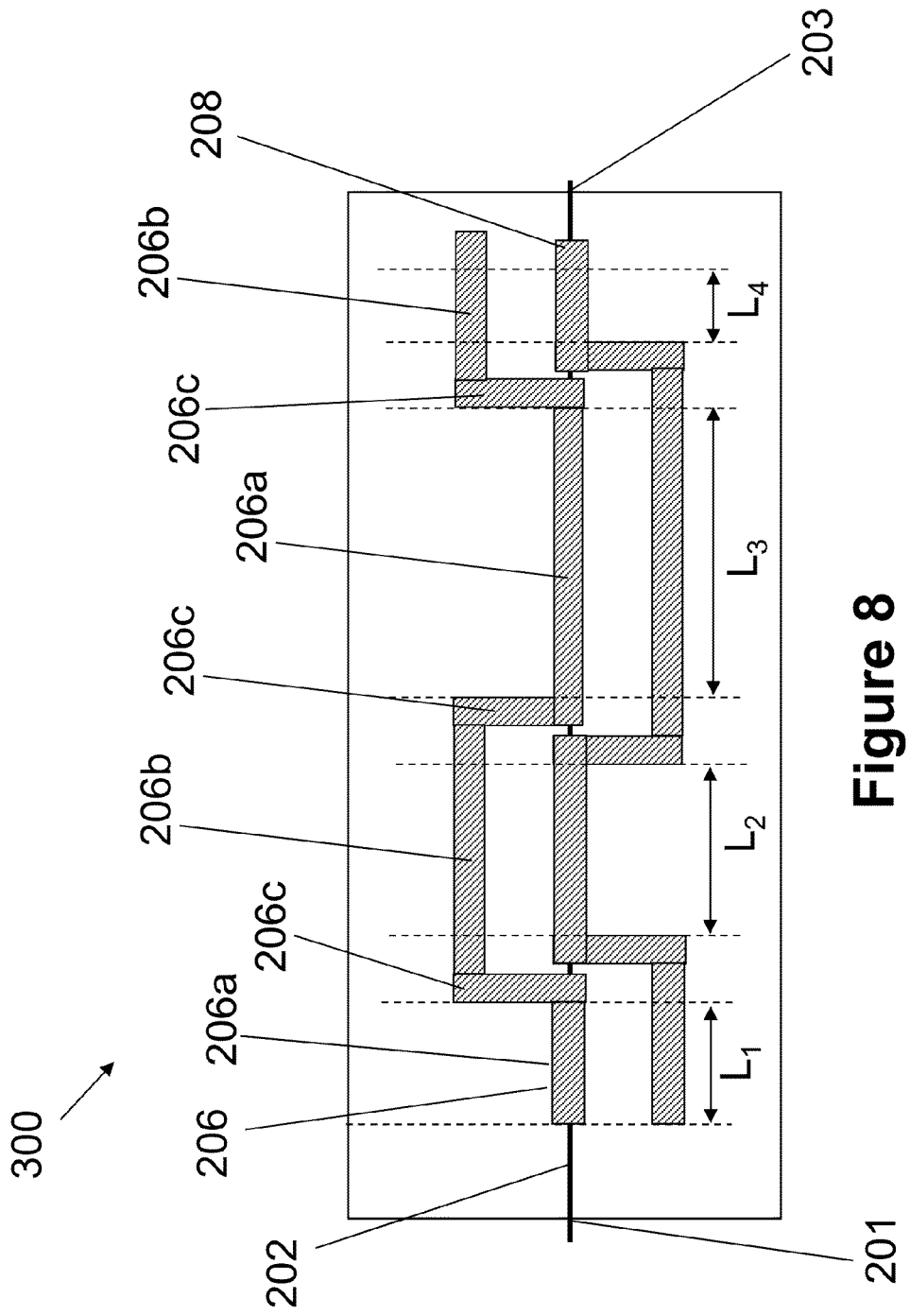
FIG. 8 is a further phase modulator having two electrodes forming four interaction lengths according to the present disclosure.

Referring now to FIG. 8, a second embodiment of the present disclosure is illustrated in the form of a four section phase modulator 300 formed from two staggered electrodes. As before, the modulation strengths are scaled 2:1 for signal electrodes #1 to #2, respectively and the I and Q signals are applied to signal electrodes #1 206 and #2 208, respectively. For brevity, the features of the second embodiment that are identical to those of the first embodiment will not be repeated. The lengths $L_1$, $L_2$, $L_3$, and $L_4$ are unequal to one another: when normalized by the total interaction length ($L_1+L_2+L_3+L_4$), these lengths are 0.189, 0.232, 0.478 and 0.102 respectively. The electrode modulation strength scaling ratio is given by $(L_1+L_3):(L_2+L_4)$ which is 0.667:0.334 and approximately equivalent to 2:1.

Figure 9:
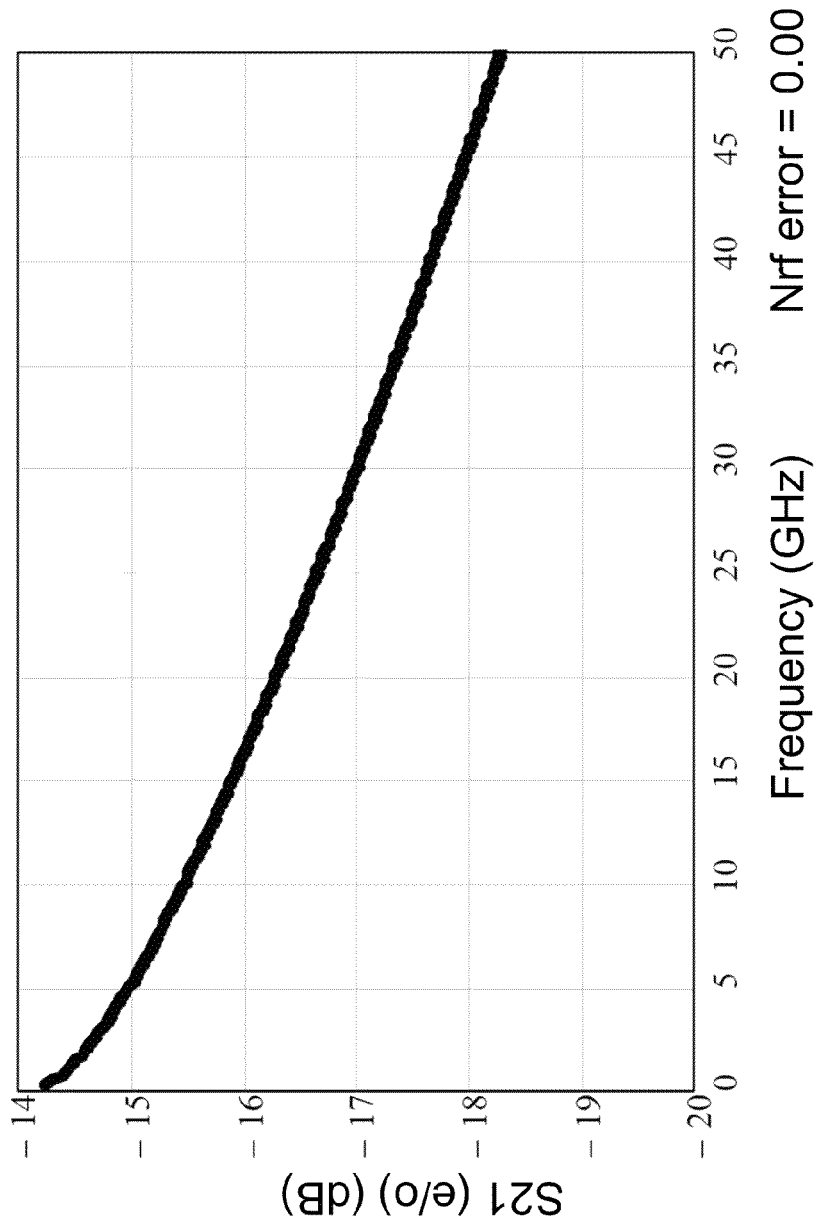
FIG. 9 is a graph of calculated S21 electro-optical frequency response for the I and Q inputs of the phase modulator according to FIG. 8 including expected RF electrode loss and presuming perfect velocity matching.
Figure 10:
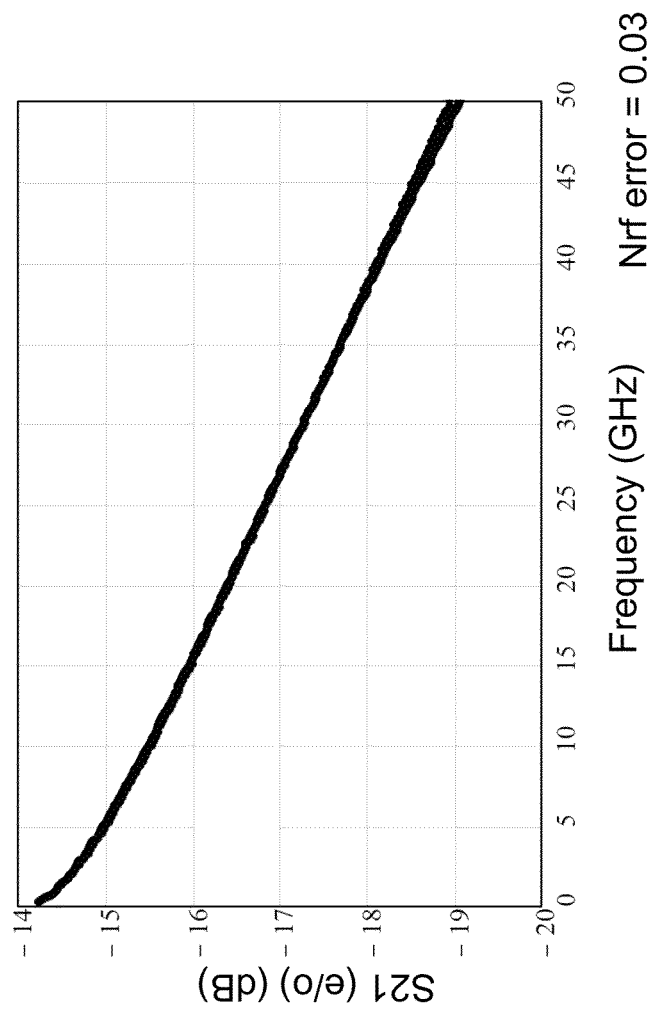
FIG. 10 is a graph of calculated S21 electro-optical frequency response for the I and Q inputs of the phase modulator according to FIG. 8 including expected RF electrode loss and velocity mismatching.

FIGS. 9 and 10 illustrate the calculated S21 (e/o) frequency responses for the phase modulator 300 of FIG. 8 for the case of perfect and slightly mismatched velocity matching, respectively. With the four interaction region design, the difference in frequency response with Nrf_error value of 0.03 is much smaller than that for the three interaction region design. In general, embodiments more effective at reducing frequency response mismatch due velocity mismatching have been found to have approximately $2N_{elec}$ interaction lengths in the set of electrodes where $N_{elec}$ is the number of signal electrodes.

Figure 11:
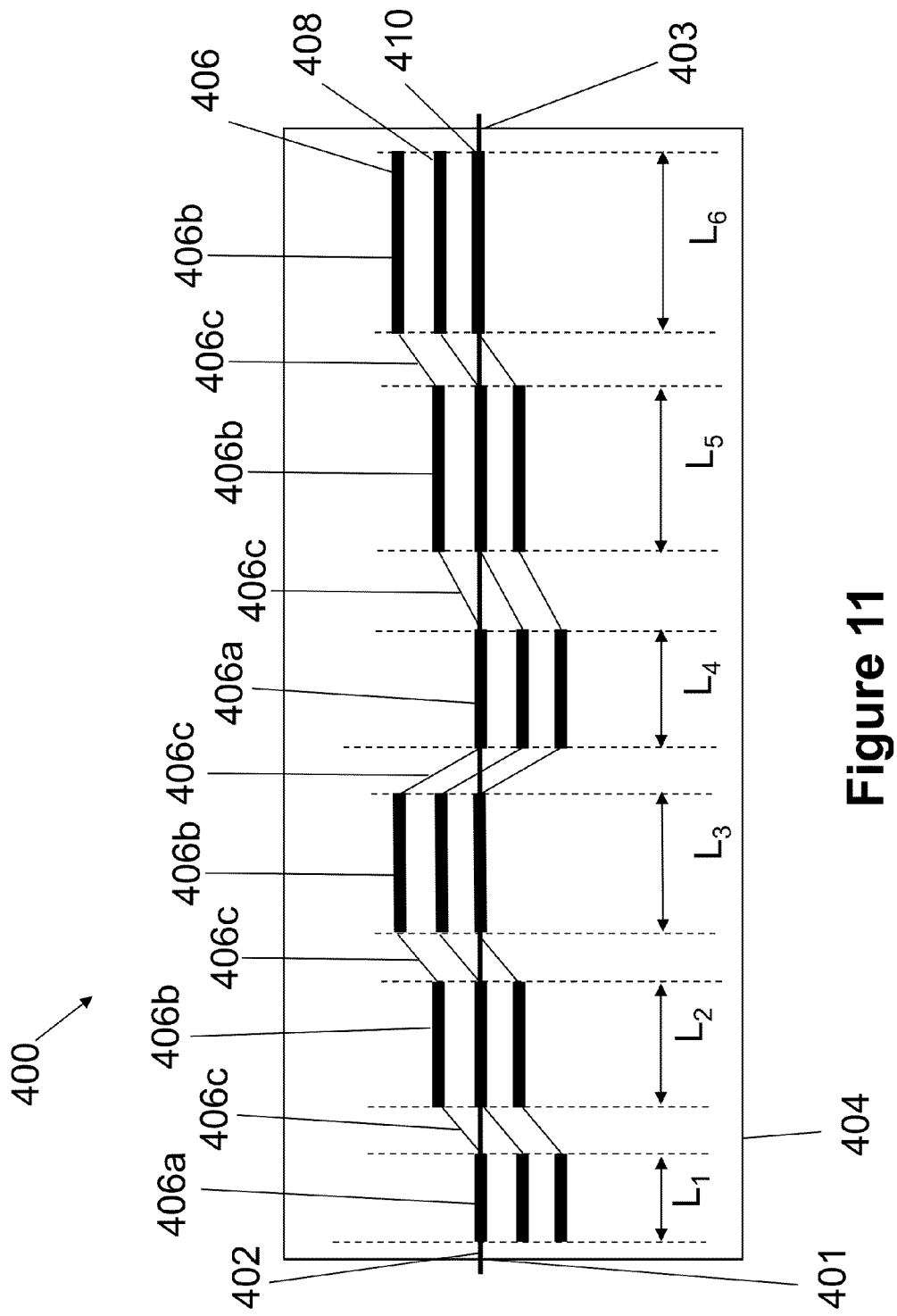
FIG. 11 is a further phase modulator having three electrodes forming six interaction lengths according to the present disclosure.

FIG. 11 illustrates a third embodiment of the present disclosure where a six section modulator is formed from three staggered electrodes. An electro-optical phase modulator 400 comprises a waveguide 402 having an input end 401 and an output end 403 is formed in a single domain structure electro-optical substrate 404. Three signal electrodes 406, 408 and 410 are provided on the substrate 404 forming shifting lines along the waveguide 402 from a first end proximate to the input 401 to a second end proximate to the output 403. Between the ends of each electrode 406, 408, 410 are a plurality of interaction lengths, shifted lengths and transition lengths. Using electrode 406 as an example, two interaction lengths 406a and four shifted lengths 406b are interspaced by five transition lengths 406c. The electrodes 406, 408 and 410 have a complimentary cascading structure that allows each of the three electrodes 406, 408, 410 to transition between interaction regions and alternate which electrode 406, 408, 410 has an interaction length along the waveguide 402. In FIG. 11, there are 6 interaction regions, having lengths $L_1$, $L_2$, $L_3$, $L_4$, $L_5$ and $L_6$, respectively, corresponding to the lengths of the respective interaction lengths of the different electrodes 406, 408, 410 proximate to the waveguide 402 in each of the interaction regions.

The normalized interaction lengths for the phase modulator 400 are listed in Table 1; however, mathematical optimization has set the first interaction length 406a of the first electrode 406 to zero. This will be explained in further detail when discussing the system of equations for determining electrode interaction lengths.

TABLE 1

Interaction Lengths
Normalized to Total Length

| Interaction Length # | Normalized Length |
| --- | --- |
| 1 | 0.000 |
| 2 | 0.071 |
| 3 | 0.329 |
| 4 | 0.143 |
| 5 | 0.215 |
| 6 | 0.242 |

Figure 1:
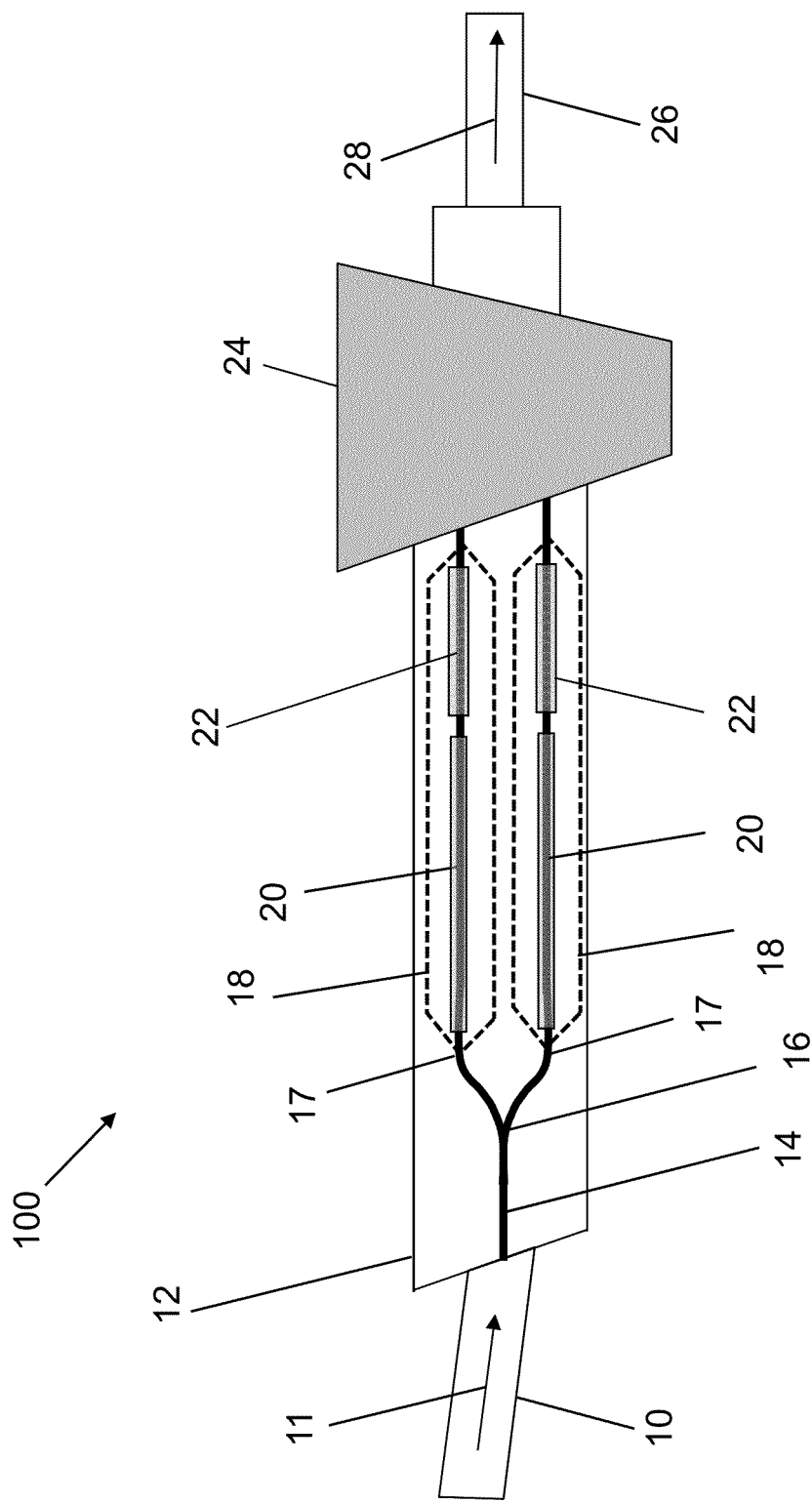
FIG. 1 is a prior art electro-optical modulator having dual phase modulators.
Figure 2:
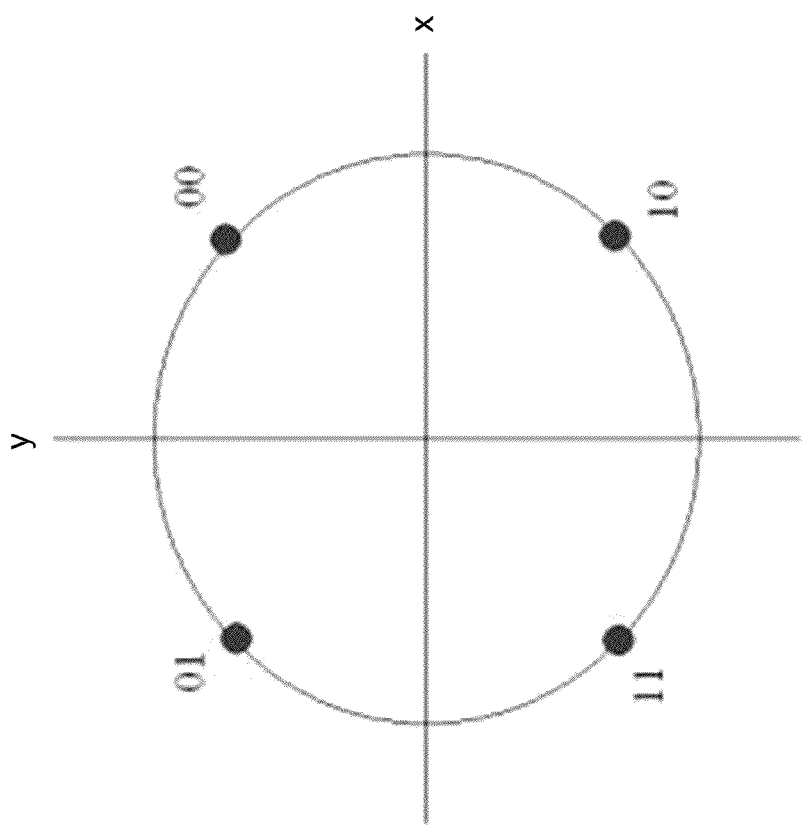
FIG. 2 is an optical phase constellation diagram for the QPSK signal produced by each phase modulator in FIG. 1.
Figure 3:
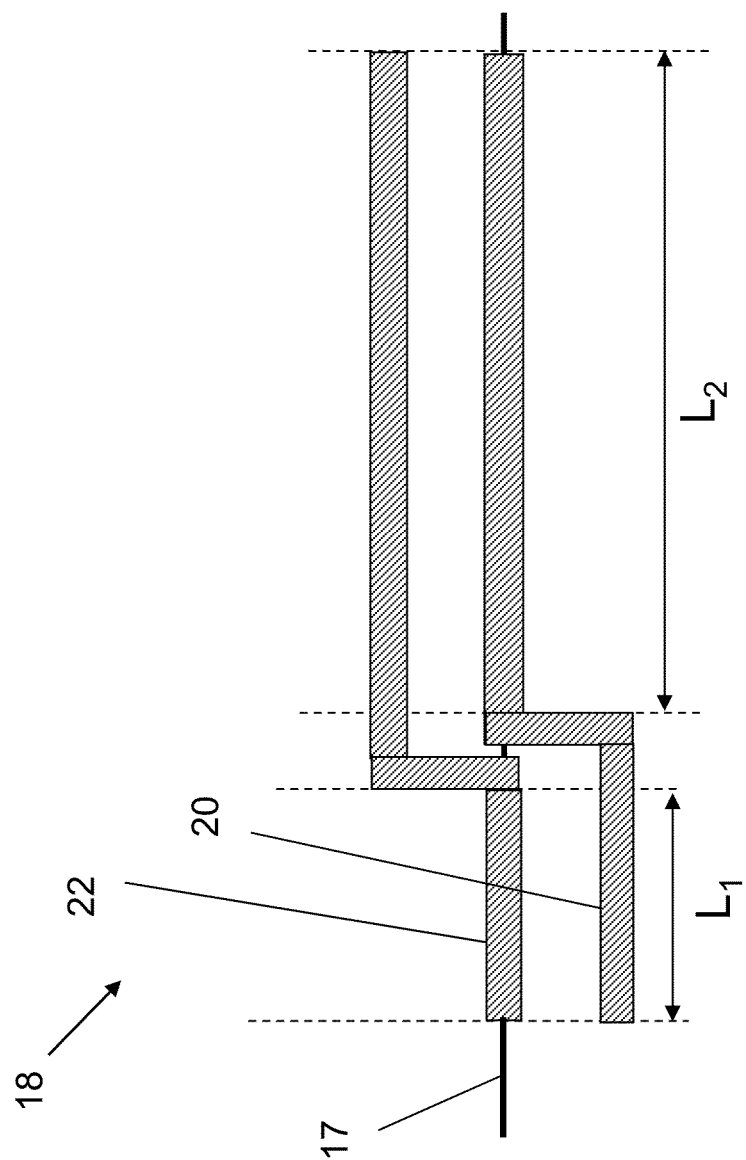
FIG. 3 is an prior art electro-optical phase modulator configuration.
Figure 4:
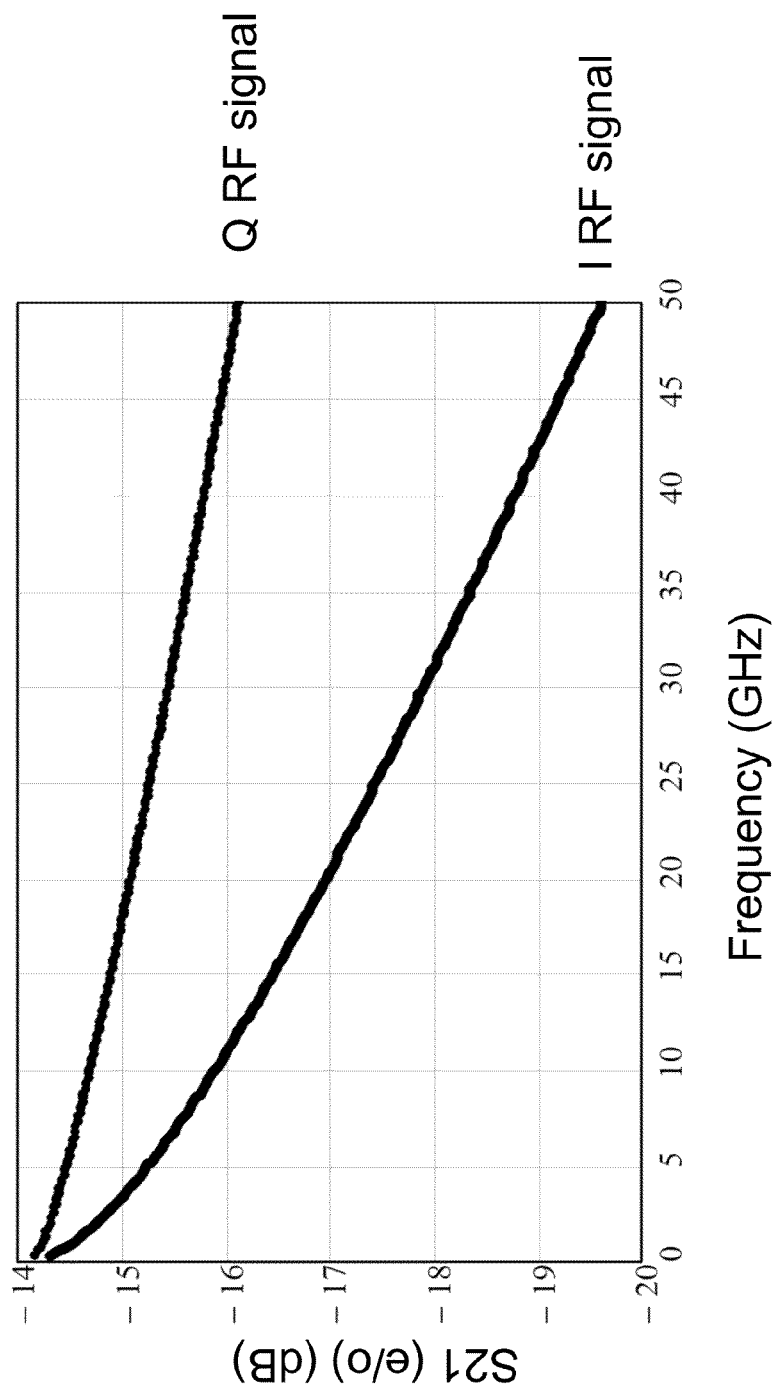
FIG. 4 is a graph of calculated S21 electro-optical frequency response for the I and Q inputs of a phase modulator according to FIG. 3 including expected RF electrode loss but not velocity mismatching.

The modulation strengths are scaled by the ratio 1:2:4 for signal electrodes 406, 408, 410, respectively. Phase modulator 400 may be applied in the device 100 of FIG. 1 where a third electrode has been added to allow for 8 phase shift keyed constellation points around the circle in FIG. 2 instead of the just four points shown. As before, precoding of the electrical signals would be required to preserve the digital data sequence at the receiver.

In some embodiments, the precoding of more than two signal electrodes involves precoding the digital data on all signal electrodes in the electrode set except for the signal electrode having the greatest total interaction length (corresponding to the greatest modulation strength). In some embodiments, the prescaling is determined using a look up table providing coded signals for all electrodes. Look up table electronics can provide a unique output digital word for each set of input digital words.

Figure 12:
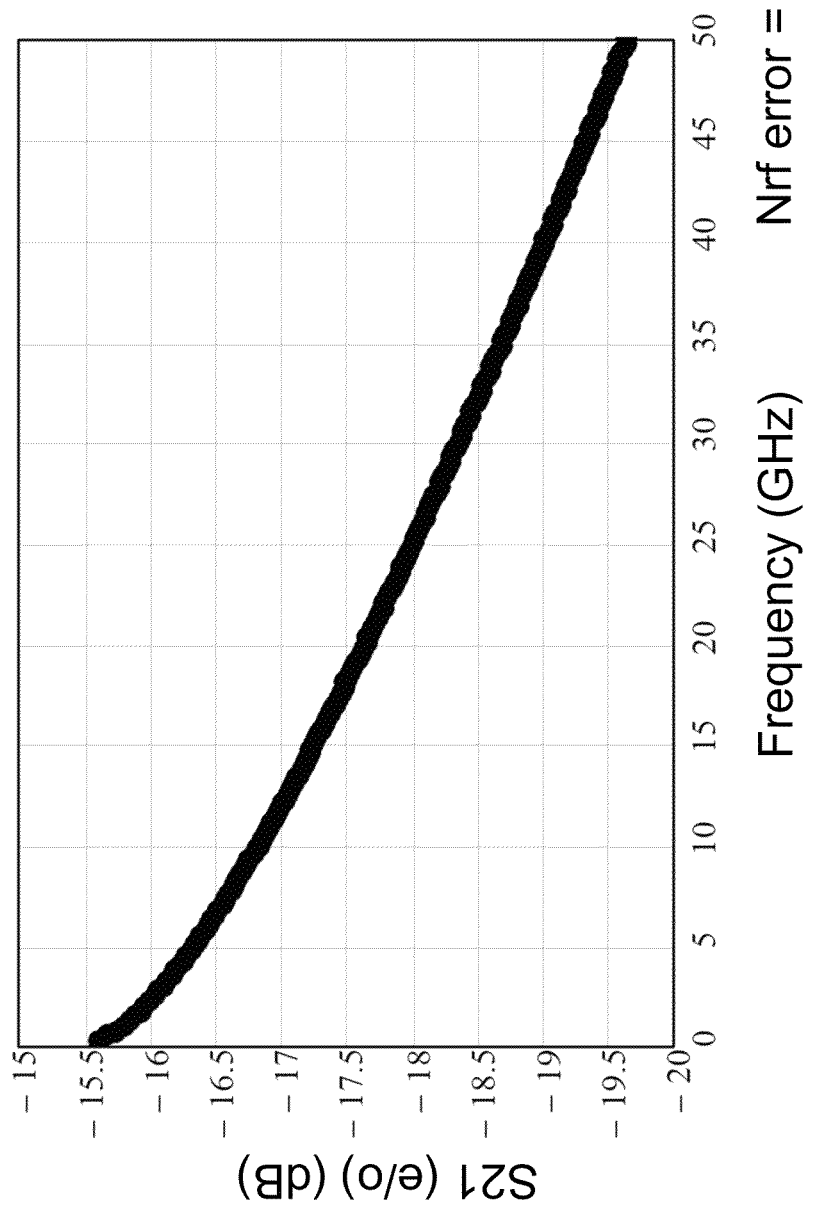
FIG. 12 is a graph of calculated S21 electro-optical frequency response for the three inputs of the phase modulator according to FIG. 11 including expected RF electrode loss and presuming perfect velocity matching.
Figure 13:
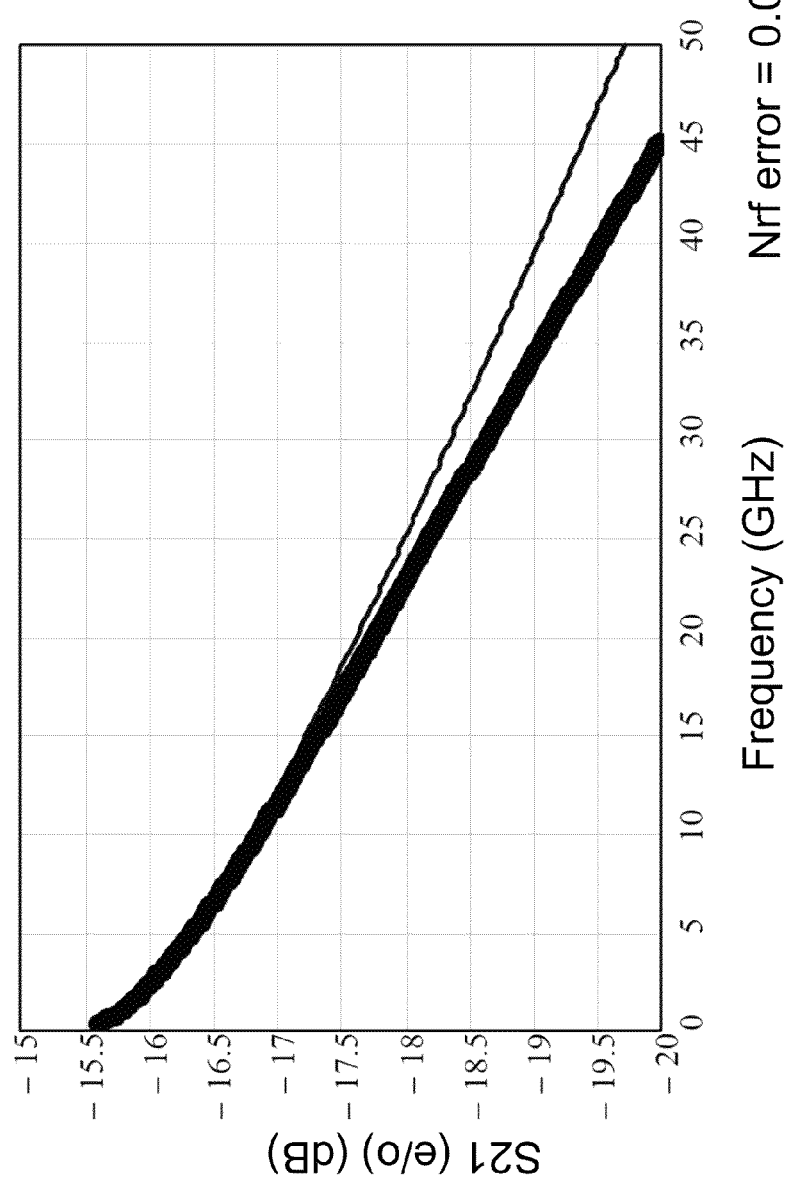
FIG. 13 is a graph of calculated S21 electro-optical frequency response for the three inputs of the phase modulator according to FIG. 11 including expected RF electrode loss and velocity mismatching.

FIGS. 12 and 13 illustrate the calculated S21 (e/o) frequency response for all three electrodes for the design of FIG. 11 for the case of perfect and slightly mismatched velocity matching, respectively. The three curves lie on top of one another in FIG. 12 while the curve for signal electrode #1 406 is about 0.5 dB higher than the other two curves at 40 GHz.

Note in Table 1 that the first interaction length 406a of the first electrode 406 has been set to zero, hence there is effectively one less interaction region than illustrated in FIG. 11 and signal electrode #1 406 effectively has only one e/o interaction region with length greater than 0. Having only one e/o interaction length rather than two (as the other electrodes have) makes modulation from signal electrode #1 406 more susceptible to velocity mismatch as demonstrated in FIG. 13. Setting this first interaction length to 0 is only one possible configuration of the interaction lengths of a 3 electrode, 6 interaction length phase modulator 400. As will be described in greater detail when considering the generalized mathematics of the present disclosure, the phase modulator 400 of FIG. 11 is underspecified. Alternatively, the phase modulator 400 can be improved by adding another three interaction lengths in order to further reduce the sensitivity to optical-microwave velocity mismatch.

Generalized mathematics for defining the interaction lengths of the e/o interaction regions is now described. Selection of the normalized lengths for FIGS. 5, 8 and 11, comes from the equations for the estimated electro-optic response of a general modulator, for the case where electrode RF loss is accounted for, but optical-microwave velocity mismatch is not. The equations are presented in FIGS. 14-16 in addition to being described below.

Equation (1) describes the RF electrical loss in an RF electrode as a coefficient, $\alpha(f)$, which has two components, one proportional to frequency, f, with coefficient $\alpha_{00}$, and a second one proportional to square root of frequency, $\sqrt{f}$, with coefficient $\alpha_{01}$. The former term captures radiative, scattering, and other RF losses, while the latter term captures skin effect loss. Typical values for $\alpha_{00}$ and $\alpha_{01}$ are 0.013 dB/(GHz-cm) and 0.13 dB/(GHz$^{0.5}$-cm), respectively, for an RF electrode that is used in 40 G and 100 G modulator applications.

$$\alpha(f) = (\alpha_{00} f + \alpha_{01} \sqrt{f}) \quad (1)$$

The voltage of the RF signal on an electrode is given by Equation (2)

$$V(f, L) = V_0 e^{-\alpha(f)L} \quad (2)$$

where $V_0$ is the voltage on the electrode at length zero, corresponding to the start of the first e/o interaction region or the start of the first interaction length of the modulator, $\alpha(f)$ is defined by Equation (1), and L is the length along the RF signal electrode. A typical electrode length is 40 to 50 mm, or 46 mm for the designs shown in FIGS. 5, 8, and 11.

For these mathematical equations, the typical electrode length and the length along the RF signal electrode are different quantities. The typical electrode length is the whole length of the electrode, for example, tracing the electrode's variously shifting structure, or the length if that structure was straightened out and measured. The length along the electrode ignores the transition lengths or space between interaction regions where the electrodes transition, shift or jog relative to waveguide. Although some RF loss and modulation of the waveguide will occur in these transition lengths, these quantities are negligible. Furthermore, ignoring the transition lengths and transition regions simplifies the mathematical equations because the number of interaction lengths in the set of electrodes (N) is the same as the number of sections (interaction lengths and shifted lengths) in each electrode when transition lengths are excluded and the total length of each electrode can be considered the same.

The normalized electro-optic response for the $i^{th}$ section, $F_{i,j}(f, L_{s,i}, L_{f,i})$, is given by Equation 3.

$$F_{i,j}(f, L_{s,i}, L_{f,i}) = \frac{EO_{i,j}}{V_0 L_{tot}} \int_{L_{s,i}}^{L_{f,i}} V_0 e^{-\alpha(f)z} dz = EO_{i,j} \frac{\left(e^{-\alpha(f)L_{s,i}} - e^{-\alpha(f)L_{f,i}}\right)}{\alpha(f) L_{tot}} \quad (3)$$

where $L_{s,i}$ and $L_{f,i}$ are the length of RF signal electrode from the start of the electrode, up to the start and finish of the $i^{th}$ section, respectively, hence $L_{f,i} - L_{s,i} = L_i$ is the length of the $i^{th}$ interaction length, and $L_{tot}$ is the total length of signal electrodes in the e/o interaction region, or equivalently, the sum of the interaction lengths of all electrodes. The parameter $EO_{i,j}$ is the strength of the electro-optic modulation of the $i^{th}$ section, for the $j^{th}$ electrode normalized to a maximum value of 1. For example, for the embodiments shown in FIGS. 5, 8, and 11, $EO_{i,j} = 1$ for the $j^{th}$ electrode and $i^{th}$ section when that electrode is directly over the waveguide (i.e. it is an interaction length) while $EO_{i,j} = 0$ in sections of the $j^{th}$ electrode distal from the waveguide (i.e. a shifted length). Recall that the transition lengths are excluded from these equations for simplification.

Sometimes it is found that setting $EO_{i,j}$ for a shifted length to a very small value instead of zero helps MathCad or other mathematical optimization software solve the simultaneous equations to be described later. The actual value of $EO_{i,j}$ is still zero or practically zero in any case.

The total normalized electro-optic response for the $j^{th}$ electrode is given by Equation (4)

$$F_{total,j}(f) = \sum_{i=1}^{N} EO_{i,j} \frac{(e^{-\alpha(f)L_{s,i}} - e^{-\alpha(f)L_{f,i}})}{\alpha(f)L_{tot}} \quad (4)$$

for f>0, where the values for the individual sections are added together, and N is the total number of sections in each electrode. At DC $\alpha(f)=0$, hence Equation (2) becomes Equation (5)

$$V(0,L) = V_0 \quad (5)$$

and Equation (3) becomes Equation (6)

$$F_{total,j,DC} = \sum_{i=1}^{N} EO_{i,j} \frac{L_i}{L_{tot}} \quad (6)$$

where $F_{total,j,DC}$ is the normalized electro-optic response at DC or near DC, for example at 10 kHz. Note that transition sections where the electrodes moves off and on the waveguide and/or move laterally can be included in the equations as additional sections of a fixed length where $EO_{i,j}$ equals zero for those sections.

The lengths of the electrode sections is found from the set of simultaneous equations defined by equations (7), (8) and (9).

$$F_{total,j,DC} = c_j F_{total,j-1,DC}, j=2, \ldots N_{elec} \quad (7)$$

$$F_{total,j}(f_k) = c_j F_{total,j-1}(f_k), j=2, \ldots N_{elec} \quad (8)$$

where $c_i$ is a scaling factor relating the net modulation strength in the $j^{th}$ electrode related to the (j−1) electrode at the $k^{th}$ design frequency, where k=1, 2, ... $N_{freq}$, where $N_{elec}$ is the number of electrodes. Equation (7) defines the scaling between modulation strengths at or near DC, while Equation (8) defines the scaling between modulation strengths at higher frequencies. The number of design frequencies other than DC, $N_{freq}$, depends on the number of interaction lengths, and is determined by the degrees of freedom in the design which is equal to N−1. Equation (9) must be satisfied for the number of simultaneous equations from Equations (7) and (8) to be equal to or less than the number of degrees of freedom.

$$(N_{freq}+1)(N_{elec}-1) \leq (N-1) \quad (9)$$

The number of design frequencies other than DC, $N_{freq}$, is chosen to be the largest number that satisfies Equation (9). For example, for the design in FIG. 5, N=3 and $N_{elec}$=2, hence $N_{freq}$=1. The single design frequency $f_1$ is chosen to be the maximum frequency of interest, for example 40 GHz for the 100 G CFP modulator operating with RF digital signals that are 25 to 40 Gbaud/sec. Equation (7) will define the relationship at DC and Equation (8) will define it at the max frequency of interest, hence frequencies in between will approximately follow the same scaling factor $c_2$.

In FIG. 8, N=4 and $N_{elec}$=2, hence $N_{freq}$=2. The two design frequencies other than DC, $f_1$ and $f_2$, are chosen to span the frequency range of interest, or 20 GHz and 40 GHz. Hence, the scaling is being defined at DC, 20 GHz, and 40 GHz. The more frequencies used to define the scaling, the better the approximation will be between the design frequencies. In addition, the increased number of interaction lengths reduce the sensitivity to optical-microwave velocity mismatch and fabrication variations that cause RF loss coefficients $\alpha_{00}$ and $\alpha_{01}$ to deviate from their design values.

In FIG. 11, N=6 and $N_{elec}$=3, hence $N_{freq}$=1. The same $f_1$ is used in this example (40 GHz) as was used for the design of FIG. 5.

One final equation is Equation (10), that is a constraint that the sum of all electrode sections (excluding transition lengths) add up to the total. It does not really use up a degree of freedom, but must not be violated. In addition, all section lengths are constrained to be non-negative values.

$$L_{tot} = \sum_{i=1}^{N} L_i \quad (10)$$

Equations (7), (8), and (10) define the set of simultaneous equations from which the lengths of the interaction lengths corresponding to individual electrode sections and modulator interaction regions are determined. For example, for the design shown in FIG. 5 which has two electrodes each having three sections corresponding to three interaction regions in the optical modulation arrangement, there is one equation from Equation (7) and one from Equation (8). Adding one equation from Equation (10) provides a total of three equations for the three unknowns ($L_1$, $L_2$, and $L_3$). For the design shown in FIG. 8 which has two electrodes, four interaction regions and two design frequencies, there is one equation from Equation (7) and two from Equation (8). Adding one equation from Equation (10) provides a total of four equations for the four unknowns ($L_1$, $L_2$, $L_3$, and $L_4$). Finally, for the design shown in FIG. 11 which has one design frequency, three electrodes and six interaction regions, there are two equations from Equation (7) and two equations from Equation (8). Adding one equation from Equation (10) provides a total of five equations for the six unknowns ($L_1$, $L_2$, $L_3$, $L_4$, $L_5$, and $L_6$). Length $L_1$ being set to zero by the mathematical optimization solver may be a result of the problem being under specified where there is one more unknown than number of simultaneous equations to solve. One could explore the length $L_1$ as a free parameter and its effect on reducing the sensitivity of frequency response mismatch to $L_1$.

Additional interaction regions, electrodes, and/or design frequencies can be added to create more complex designs, so long as Equation (9) is satisfied.

Figure 17:
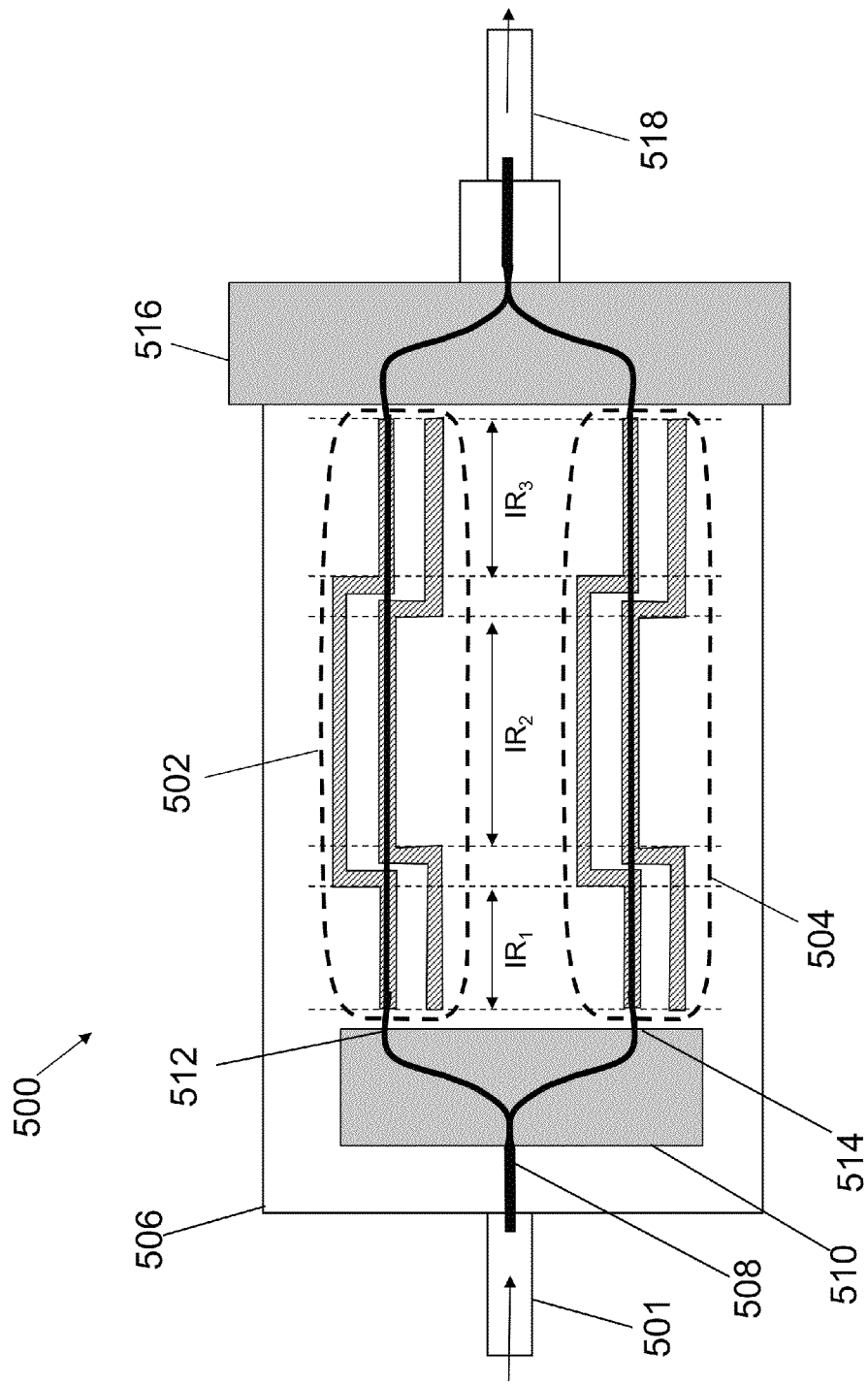
FIG. 17 is a dual polarization QPSK modulator having phase modulators according the present disclosure.

Referring to FIG. 17, a 100 G CFP modulator 500 having dual electro-optical phase modulators 502, 504 according to the first embodiment is illustrated. The 100 G CFP modulator 500 is similar to the 100 G CFG modulator of FIG. 1; however, any phase modulator according to the set of simultaneous equations can replace the dual phase modulators 502, 504 depending on the number of RF input signals in modulator 500.

The modulator 500 comprises an input fiber 501 for receiving incoming light coupled to a substrate 506 through a waveguide 508 formed in the substrate 506. An optical splitting arrangement 510 divides the incoming light on to two paths in optically parallel waveguide arms 512, 514 of the substrate 506. Each waveguide arm 512, 514 is modulated by one of the electro-optical phase modulators 502, 504 before the resulting data modulated light is recombined in a micro-optical polarization multiplexer 516 and output through output fiber 518.

Both modulators 502, 504 are identical in structure in FIG. 17 but receive different precoded RF data input signals. The modulators share the same interaction regions and thus have the same electrode structures as previously described in respect of FIG. 5.

Figure 18:
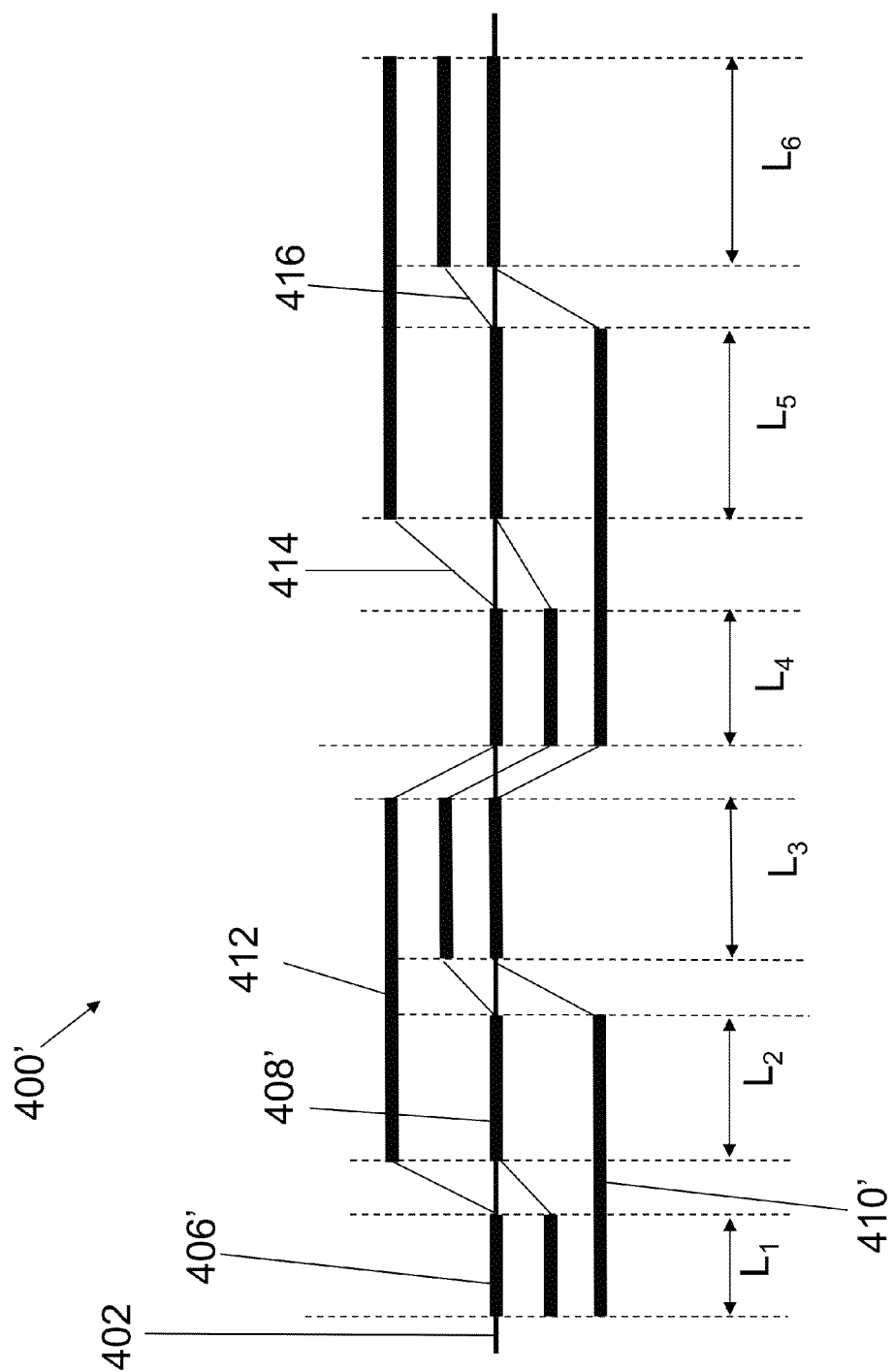
FIG. 18 is an alternative electrode configuration of the phase modulator of FIG. 11.

FIG. 18 illustrates an alternative non-complimentary electrode structure which may be applied to any of the electro-optical phase modulators according to the present disclosure. Using the three electrode, six interaction section electro-optical phase modulator 400 of FIG. 11 as a starting point, instead of a cascading or parallel and complementary pattern of changing electrode structure, the electrodes 406', 408', 410' shift away or towards the waveguide incongruently from one another. For example, a shifted length 412 may span consecutive interaction regions where the other two electrodes 408', 410' successively modulate the waveguide 402. Alternatively, a transition length 414 may shift an electrode further way from the waveguide 402 than is immediately necessary in order to accommodate a subsequent transition length 416. This incongruent set of electrodes may be disadvantageous in practice because the modulation effects of the differently shaped transition lengths and shifted lengths may not be well balanced.

An example method for electrically phase modulating light in an electro-optical phase modulator is now described. Similar to the embodiments thus far described, the electro-optical phase modulator of this method comprises a waveguide formed in a substrate of single domain structure electro-optical material. The waveguide has an input and an output. A set of at least two electrodes is disposed on the substrate extending from the input to the output and ground lines are disposed on the substrate relative to the set of electrodes. A precoded digital data input signal drives the electrodes near the input. Light is received in the waveguide at the input. Each electrode in the set is driven from an end proximate to the input with a sequential bit from the precoded digital data input signal. The light in the waveguide is modulated from a first interaction length of a first electrode proximate to the waveguide. The first electrode is then shifted away from the waveguide such that the first electrode does not modulate any waveguides. Concurrently, a second electrode is shifted towards the waveguide. After both electrodes have been shifted, the light in the waveguide is modulated from a first interaction length of the second electrode proximate to the waveguide. Now the second electrode is shifted away from the waveguide such that the second electrode does not modulate any waveguides while the first electrode is shifted back towards the waveguide. After both electrodes have been shifted this second time, the light in the waveguide is modulated from a second interaction length of the first electrode proximate to the waveguide. This second interaction length is longer than the first interaction length of the first electrode. After this third modulating, the data modulated light is output from the waveguide.

The interaction lengths of the electrodes operated in this method are provided such that the total interaction length of each electrode is proportional to the geometric sequence $2^{n-1}$ for n=1 to the number of electrodes in the set. Each electrode produces S21 electro-optical frequency responses that are approximately equal to each other, when shifted to account for the differences in total interaction lengths between electrodes, over a frequency range of 10 kHz to 50 GHz.

Figure 19:
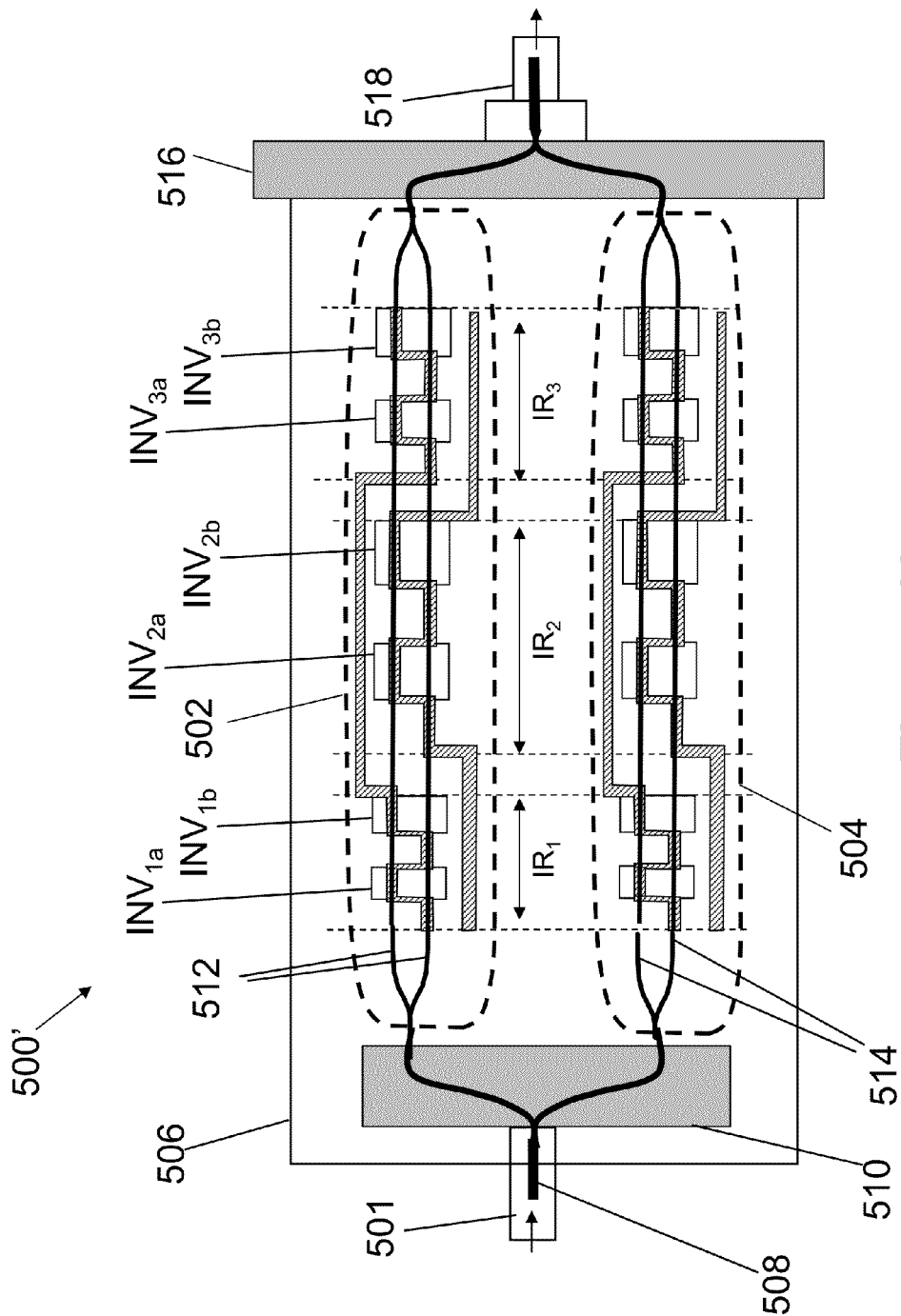
FIG. 19 is an alternative interaction region configuration of a modulator similar to the phase modulator of FIG. 17 including Mach-Zehnder interferometers with domain inversion regions.

Referring now to FIG. 19, another embodiment 500' of the present disclosure is illustrated where each interaction region $IR_1$, $IR_2$, $IR_3$, of each modulator 502, 504 includes an interaction length that is split into several sections that alternate between modulating different waveguides with pairs of electrode polarity and domain inversion sections $INV_{1a}$, $INV_{1b}$, $INV_{2a}$, $INV_{2b}$, $INV_{3a}$, and $INV_{3b}$ corresponding with each interaction length to achieve zero-chirp, as described in U.S. Pat. No. 7,701,630. The two signal electrodes would be scaled, have same the frequency response, and the modulators 502, 504 would have zero chirp. The modulator provides Quadrature Amplitude Modulation (QAM) without the need for electrical summation and scaling of digital signals. Electrical precoding may be required. The scaling ratio may be $2^{n-1}$ or some other value to optimize the constellation diagram for QAM.

Figure 20:
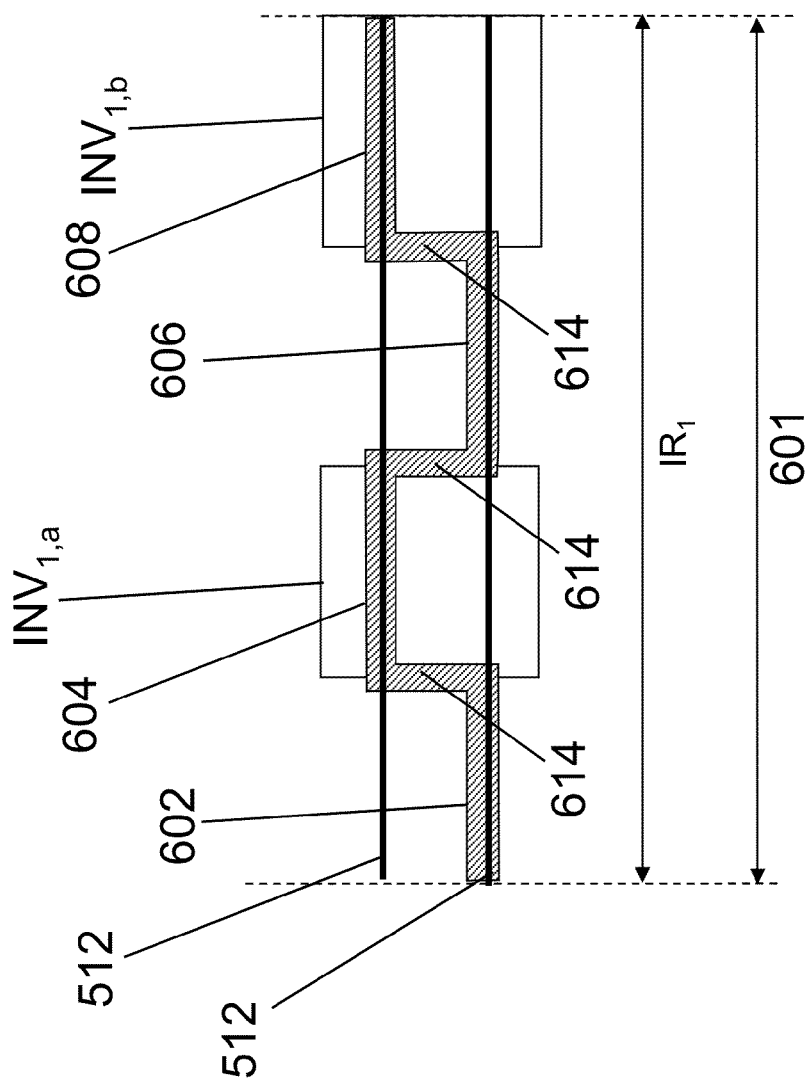
FIG. 20 is an alternative modulator including Mach-Zehnder interferometers with domain inversion regions similar to FIG. 19.

FIG. 20 provides an enlarged view of an interaction region of the embodiment 500' of FIG. 19. Specifically, interaction region $IR_1$ of modulator 502 is illustrated in greater detail. As described in U.S. Pat. No. 7,701,630, the interaction region $IR_1$ includes an interaction length that is split into several sections that alternate between modulating different waveguides with a pair of electrode polarity and domain inversion sections $INV_a$ and $INV_b$. The interaction length 601 is divided into four sections 602, 604, 606 and 608. Sections 602 and 606 have unequal length and modulate the same waveguide branch 610. Sections 606 and 608 have unequal length and modulate the same waveguide branch 612. Transition sections 614 within the interaction length 601 displace the signal electrode between waveguide branches 610, 612.

Although the waveguides and electrode structures have been illustrated as straight lined structures, in some embodiments the waveguides and electrode structures may be curved into various shapes (such as an S or C shape to minimize package size) so long as the relative position of the waveguides and electrode structures are maintained.

In some embodiments, the digital data provided on signal electrodes may also be electrically predistorted to overcome non-linearities, dispersion, or other distortions of signal caused by the transmission media such as optical fiber.

Where examples, alternative embodiments and additional aspects of those embodiments have been described in the present disclosure, those examples, embodiments and aspects may be combined in any manner within a single embodiment unless the present disclosure suggests otherwise.

Where any claim enumerates elements or actions (alphabetically, numerically or otherwise), these enumerations are provided for identification purposes only and do not imply any order of actions. The order of actions in a claim having enumerated actions (alphabetically, numerically, or otherwise) is determined by the language of the claims as informed by the specification, and not by the enumeration order of those actions.

I claim:

1. An electro-optical phase modulator comprising:
   a substrate of electro-optical material;
   a waveguide formed in the substrate comprising an input for receiving incoming light and an output for outputting data modulated light;
   a set of at least two electrodes disposed on the substrate for modulating the waveguide;
   ground lines disposed on the substrate relative to the set of electrodes;
   each electrode in the set forming a shifting line relative to the waveguide and comprising:
      a first end proximate to the input for receiving a sequential bit of a precoded digital data input signal,
      at least one interaction length proximate to the waveguide for causing modulation in the waveguide;
      at least one shifted length distal from the waveguide for avoiding causing modulation in any other waveguides;

at least one transition length between an interaction length and a shifted length, for shifting the electrode away from or towards the waveguide; and a second end proximate to the output;

at least one electrode of the set having a first interaction length proximate to the input that is shorter than a second interaction length of the same electrode;

at any position along the waveguide, at most one interaction length is proximate to the waveguide and adjacent interaction lengths are driven by different electrodes; and each electrode having a modulation strength proportional to the sum of its interaction lengths, whereby a scaling ratio of the modulation strengths is equivalent to the geometric sequence $2^{n-1}$ for n=1 to the number of electrodes in the set and whereby the modulation strengths of each electrode produce S21 electro-optical frequency responses that are approximately equal to each other, when shifted to account for the scaling ratio.

2. The electro-optical phase modulator of claim 1 wherein a centerpoint of the waveguide is located further from the input than a centerpoint of the interaction lengths of the at least one electrode having a first interaction length proximate to the input that is shorter than a second interaction length of the same electrode.

3. The electro-optical phase modulator of claim 1 wherein the S21 electro-optical responses differ from one another by less than 3 dB when shifted to account for the scaling ratio, over a frequency range of 20 GHz to 50 GHz.

4. The electro-optical phase modulator of claim 1 wherein the electrodes share the same congruent linear shape.

5. The electro-optical phase modulator of claim 4 wherein the electrodes cascade one after the other towards and away from the waveguide.

6. The electro-optical phase modulator of claim 4 wherein the ground lines share the same congruent linear shape as the electrodes.

7. The electro-optical phase modulator of claim 1 wherein ground lines comprise ground lines on each side of each electrode.

8. The electro-optical phase modulator of claim 1 wherein the number of interaction lengths in the electrode set is twice the number of electrodes in the electrode set.

9. The electro-optical phase modulator of claim 1 wherein the interaction lengths are determined in accordance with an RF electrode loss formula proportional to frequency and the square root of frequency equivalent to $\alpha(f)=(\alpha_{00}f+\alpha_{01}\sqrt{f})$.

10. The electro-optical phase modulator of claim 1 wherein the number of design frequencies, $N_{freq}$, excluding DC, is the largest number that satisfies (Nfreq+1)(Nelec−1)≤(N−1) where $N_{elec}$ represents the number of electrodes and Nrepresents the number of interaction lengths.

11. The electro-optical phase modulator of claim 1 wherein the precoded digital data input signal comprises a digital data signal where the bits corresponding to a second and all subsequent electrodes of the plurality of electrodes are precoded to preserve the bit sequence in the data modulated light output.

12. A dual polarization electro-optical modulator comprising:

an optical splitting arrangement (OSA) for splitting incoming light into a first and a second waveguide arm, both arms formed in a substrate of electro-optic material;

an optical combining arrangement (OCA) for polarization multiplexing the light from both arms into a dual polarization output signal;

a first and a second set of at least two multi-section electrodes and ground lines disposed on the substrate along the first and second arms, respectively;

a first and a second precoded digital data input signal associated with the first and second electrode sets, respectively;

each electrode of either set forming a shifting line relative to its respective waveguide and comprising:

a first end proximate to the OSA for receiving a sequential bit of its respective precoded digital data input signal;

at least one interaction length proximate to its respective arm for causing modulation in that arm;

at least one shifted length distal from its respective arm for avoiding causing modulation in either arm;

at least one transition length between an interaction length and a shifted length for shifting the electrode away from or towards its respective arm; and a second end proximate to the OCA;

at least one electrode of each set having a first interaction length proximate to that electrode's first end that is shorter than a second interaction length of the same electrode;

at any position along both waveguide arms, at most one interaction length is proximate to each arm and interaction lengths adjacent on the same arm are driven by different electrodes; and each electrode having a modulation strength proportional to the sum of its interaction lengths, whereby a scaling ratio of the modulation strengths for each electrode set is equivalent to the geometric sequence $2^{n-1}$ for n=1 to the number of electrodes in each set and whereby the modulation strengths of each electrode produce S21 electro-optical responses that are approximately equal to each other, when shifted to account for the scaling ratio.

13. The dual polarization electro-optical modulator of claim 12 wherein a centerpoint of each arm is located further from the OSA than a centerpoint of the interaction lengths of the at least one electrode of each set having a first interaction length proximate to the input that is shorter than a second interaction length of the same electrode.

14. The dual polarization electro-optical modulator of claim 12 wherein the S21 electro-optical responses within either electrode set differ by less than 3 dB when shifted to account for the scaling ratio, over a frequency range of 20 GHz to 50 Ghz.

15. The dual polarization electro-optical modulator of claim 12 wherein the electrodes of both sets share the same congruent linear shape.

16. The dual polarization electro-optical modulator of claim 15 wherein the electrodes of both sets cascade one after the other towards and away from their respective arms.

17. The dual polarization electro-optical modulator of claim 15 wherein the ground lines share the same congruent linear shape as the electrodes.

18. The dual polarization electro-optical modulator of claim 12 wherein the ground lines comprise ground lines on each side of each electrode.

19. The dual polarization electro-optical modulator of claim 12 wherein the number of interaction lengths in each electrode set is twice the number of electrodes in each electrode set.

20. The dual polarization electro-optical modulator of claim 12 wherein the interaction lengths are determined in accordance with an RF electrode loss formula proportional to frequency and the square root of frequency equivalent to $\alpha(f)=(\alpha_{00}f+\alpha_{01}\sqrt{f})$.

21. The dual polarization electro-optical modulator of claim 12 wherein the number of design frequencies, $N_{freq}$, excluding DC, is the largest number that satisfies (Nfreq+1)(Nelec−1)≤(N−1) where $N_{elec}$ represents the number of electrodes in each set and N represents the number of interaction sections in each set of electrodes.

22. The dual polarization electro-optical modulator of claim 12 wherein the precoded digital data input signal comprises a digital data signal where the bits corresponding to a second and all subsequent electrodes of the plurality of electrodes are precoded to preserve the bit sequence in the data modulated light output.

23. A method for electrically phase modulating light in an electro-optical phase modulator comprising a waveguide formed in a substrate of electro-optical material, the waveguide having an input and an output, a set of at least two electrodes disposed on the substrate extending from the input to the output, ground lines disposed on the substrate relative to the set of electrodes and a precoded digital data input signal, the method comprising:
 (a) receiving light in the waveguide at the input;
 (b) driving each electrode in the set from an end proximate to the input with a sequential bit from the precoded digital data input signal;
 (c) modulating the light in the waveguide from a first interaction length of a first electrode proximate to the waveguide;
 (d) shifting the first electrode away from the waveguide after (b) such that the first electrode does not modulate the waveguide;
 (e) shifting a second electrode towards the waveguide after (b);
 (f) after (d) and (e), modulating the light in the waveguide from a first interaction length of the second electrode proximate to the waveguide;
 (g) shifting the second electrode away from the waveguide after (f), such that the second electrode does not modulate the waveguide;
 (h) shifting a first electrode towards the waveguide after (f);
 (i) after (g) and (h), modulating the light in the waveguide from a second interaction length of the first electrode, longer than the first interaction length of the first electrode, proximate to the waveguide;
 (j) outputting the data modulated light from the waveguide after (i);
 (k) providing the interaction lengths of the electrodes such that the total interaction length of each electrode is proportional to the geometric sequence $2^{n-1}$ for n=1 to the number of electrodes in the set; and
 (l) producing S21 electro-optical responses from each electrode that are approximately equal to each other, when shifted to account for the differences in total interaction lengths between electrodes.

24. The method of claim 23 wherein (1) further comprises producing S21 electro-optical responses from each electrode differ from one another by less than 3 dB over a frequency range of 20 GHz to 50 GHz, after shifting to account for the differences in total interaction lengths between electrodes.

25. The method of claim 23 wherein the number of interaction lengths in the electrode set is twice the number of electrodes in the electrode set.

26. The method of claim 23 further comprising providing the interaction lengths in accordance with an RF electrode loss formula proportional to the frequency and square root of frequency equivalent to $\alpha(f)=(\alpha_{00}f+\alpha_{01}\sqrt{f})$.

27. The method of claim 23 wherein the number of design frequencies, $N_{freq}$, excluding DC, is the largest number that satisfies (Nfreq+1)(Nelec−1)≤(N−1) where $N_{elec}$ represents the number of electrodes and N represents the number of interaction lengths.

* * * * *